(12) United States Patent
Kintz et al.

(10) Patent No.: US 8,687,294 B2
(45) Date of Patent: *Apr. 1, 2014

(54) RECESSED OPTICAL SURFACES

(75) Inventors: Gregory J. Kintz, Asheville, NC (US); Michael R. Feldman, Huntersville, NC (US); James E. Morris, Charlotte, NC (US); Paul Elliott, Charlotte, NC (US); David Keller, Charlotte, NC (US); W. Hudson Welch, Charlotte, NC (US); David Ovrutsky, Charlotte, NC (US); Jeremy Huddleston, Charlotte, NC (US); Mark Hiatt, Charlotte, NC (US)

(73) Assignee: Digitaloptics Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/481,329

(22) Filed: May 25, 2012

(65) Prior Publication Data

US 2012/0229908 A1 Sep. 13, 2012

Related U.S. Application Data

(60) Division of application No. 13/050,354, filed on Mar. 17, 2011, now Pat. No. 8,189,277, which is a continuation of application No. PCT/US2009/005196, filed on Sep. 18, 2009.

(60) Provisional application No. 61/098,188, filed on Sep. 18, 2008.

(51) Int. Cl.
   *G02B 27/00* (2006.01)

(52) U.S. Cl.
   USPC .......................................... 359/797; 359/741

(58) Field of Classification Search
   USPC ................................. 359/738–741, 796, 797
   See application file for complete search history.

(56) References Cited

U.S. PATENT DOCUMENTS

| | | | |
|---|---|---|---|
| 4,154,506 A | 5/1979 | Yevick | |
| 5,453,876 A | 9/1995 | Hamada | |
| 5,617,131 A | 4/1997 | Murano et al. | |
| 5,981,945 A | 11/1999 | Spaeth et al. | |
| 6,717,738 B2 | 4/2004 | Yamada et al. | |
| 6,814,901 B2 | 11/2004 | Itoh | |
| 7,564,496 B2 | 7/2009 | Wolterink et al. | |
| 7,692,256 B2 | 4/2010 | Rudmann et al. | |
| 8,000,041 B1 | 8/2011 | Lin et al. | |
| 8,189,277 B2 * | 5/2012 | Kintz et al. | 359/797 |
| 2004/0169763 A1 | 9/2004 | Ikeda | |
| 2006/0056034 A1 | 3/2006 | Tsuruma | |
| 2006/0132644 A1 | 6/2006 | Shangguan et al. | |
| 2006/0286461 A1 | 12/2006 | Kim et al. | |
| 2008/0001241 A1 | 1/2008 | Tuckerman et al. | |
| 2011/0134555 A1 | 6/2011 | Linnen et al. | |

FOREIGN PATENT DOCUMENTS

| | | | |
|---|---|---|---|
| EP | 1 251 365 A1 | 10/2002 | |
| JP | 04-050804 A | 2/1992 | |

* cited by examiner

*Primary Examiner* — Darryl J Collins
(74) *Attorney, Agent, or Firm* — Lee & Morse, P.C.

(57) ABSTRACT

An optics block includes a substrate having first and second opposing surfaces, the substrate being a first material, a plurality of through holes extending in the substrate between the first and second opposing surface, a second material, different than the first material, filling a portion of the through holes and extending on a portion of the first surface of the substrate outside the through holes, and a first lens structure in the second material and corresponding to each of the through holes.

14 Claims, 31 Drawing Sheets

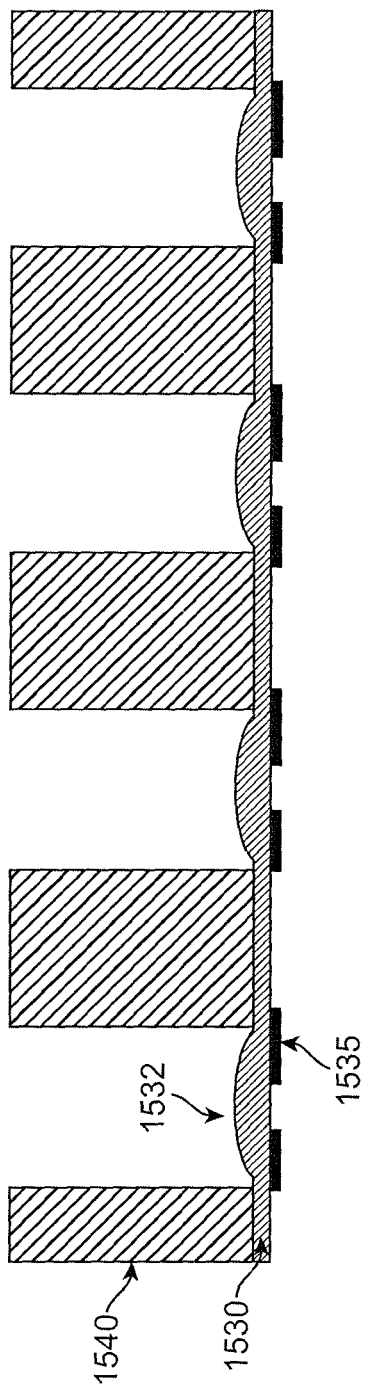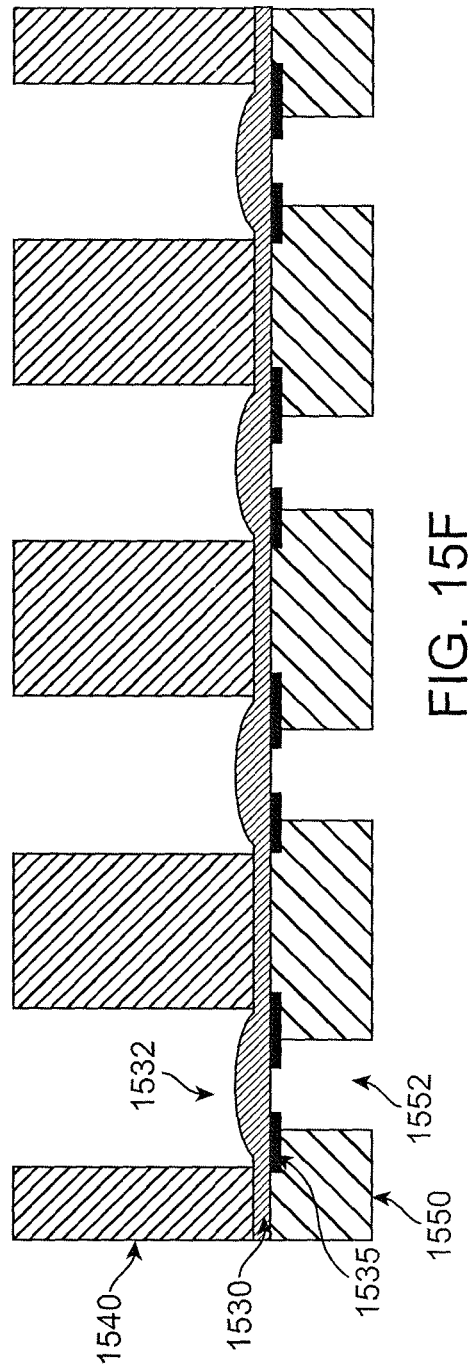

RECESSED OPTICAL SURFACES

CROSS-REFERENCE TO RELATED APPLICATIONS

The present application is a division based on application Ser. No. 13/050,354, filed Mar. 17, 2011, now U.S. Pat. No. 8,189,277 which is a continuation of International application No. PCT/US2009/005196 filed on Sep. 18, 2009, and entitled "Recessed Optical Surfaces," and claims the benefit of the filing date of U.S. Provisional Application No. 61/098,188, filed Sep. 18, 2008, all of which are hereby incorporated by reference.

BACKGROUND

The present application is related to optical surfaces formed on a substrate e.g. wafer, particularly to optical surfaces formed on a substrate in a fully or partially recessed state.

Replication has become an increasingly popular technique of forming lenses, especially in bulk. In this method, a flat substrate is provided, typically a wafer made of glass (although other substrates may be used) upon which is placed a replication material or other formable material. The replication material is then shaped by a variety of curing methods; a common approach is that of stamping the replication material with a master and curing the material to form the desired optical surfaces. Upon curing the replication material, the master can be removed, leaving behind the formed lens shapes on the wafer surface. One or both sides of the substrate can be populated with replicated lenses, and in some cases the lenses on both sides may be formed simultaneously. Thereafter, the substrate can be diced into individual lenses, although in some cases, the wafer is left intact to be joined to one or more other lens or spacer wafers to form multiple layers of lenses that are then singulated. Wafer-level fabrication of lenses is often preferred since the cost per lens is quite low compared to many other methods.

One other driving factor in the market is the tendency of lenses and consequently cameras in which they are placed to become smaller. Replication and wafer-level processing have enabled shrinking of lenses and lens stacks in both width and in thickness. Even so, the flat substrate must be thick enough to have sufficient strength and stability, and having one or two extra replicated layers with the formed lens layer adds to the overall height of each lens wafer. With increasing complexity of applications including higher density image sensors in cameras, there is greater use of multiple optical surfaces in a lens stack. Added layers compound the problem of lens heights as the thickness of the resulting lens designs may be higher than what is desired. Although this is true of both convex and concave lenses, convex lenses often pose an additional challenge. When the tops of the convex lenses are the highest points on a lens wafer, this can cause difficulties with any processing step that requires the wafer to touch another surface. Unprotected convex lenses on the surface are generally more exposed to harm from incidental damage as well.

SUMMARY

Some of the embodiments illustrated herein describe optic arrays formed by a method that includes providing a substrate, forming an array of wells on the substrate, and replicating a corresponding number of optic surfaces in the wells. In this manner, the optic surfaces are created simultaneously within the wells. The optic surfaces may be refractive, diffractive, reflective, or a combination thereof. In certain embodiments, the wells and the optic surfaces may be replicated simultaneously. In other embodiments, the array of wells may be formed in advance of replicating the optic surfaces. The array of wells may be formed using lithographic techniques, such as etching, or may be formed through mechanical means, such as drilling, blasting, or molding. The wells in which the optical surfaces are formed may include a substantially planar bottom surface or may include a base optic surface that is refractive, diffractive, reflective, or some combination thereof. In certain embodiments, wells in the array of wells extend through the substrate. A replicated lens may be formed in the wells that extend through the substrate.

Once the optic arrays are formed in the wells on a substrate, the substrate can be aligned and bonded to a second substrate. The second substrate may include a second optic array or may be a spacer substrate. In one implementation, spacing between optical surfaces on a first substrate and optical surfaces on a second substrate is provided solely by the controlled depth of the wells on the first and second substrate and without an intervening spacer. A stack of optic and/or spacer substrates can be diced to singulate the array of wells and optic surfaces to form discrete optic modules. The optic module can be aligned and bonded to a semiconductor device. The optic module can be bonded to the semiconductor device either before or after the step of separating the array of wells and optic surfaces.

Some of the embodiments may be directed to an optics block including a substrate having first and second opposing surfaces, the substrate being a first material, a plurality of through holes extending in the substrate between the first and second opposing surfaces, a second material, different than the first material, filling a portion of the through holes and extending on a portion of the first surface of the substrate outside the through holes, and a first lens structure in the second material and corresponding to each of the through holes.

The optics block may include a third material, different than the first material, extending on a portion of the second surface of the substrate outside the through holes and covering the through holes. The second material and the third material together completely fill the through holes. The second and third material may completely cover the first and second surfaces of the substrate, respectively. The second and third materials may be the same.

The first lens structure may include a first lens surface adjacent the first surface of the first substrate and in the second material and a second lens surface adjacent the second surface of the first substrate and in the third material. An interface may be between the second and third materials. The optics block as may include aperture stops between the second and third materials, the aperture stops partially extending into the through holes.

The first material may be opaque and/or dispersive. The substrate may be a mesh. Sidewalls of the through holes may be planar or angled extending along a continuous angle. Sidewalls of the through holes may be treated to block light and/or suppress reflections. The first material may have a Young's modulus of less than 20.

Some of the embodiments may be directed to an optics block including a first substrate having opposing first and second surfaces, and a first replicated structure on a first surface of the first substrate, the replicated structure including a plurality of first wells and a first lens surface that is at least partially convex and completely in each of the plurality of first wells, such that an upper surface of the first wells is higher than a top of the first lens surfaces.

The upper surface of the wells may be higher than any other structure on the first surface of the first substrate.

The optics block may include a second substrate having opposing first and second surfaces, the first surface of the first substrate facing the first surface of the second substrate, wherein the plurality of wells provides spacing between the first and second substrates. The second substrate may include a second replicated structure including a plurality of second wells on the first surface of the second substrate, the plurality of second wells corresponding to the plurality of first wells, wherein an upper surface of the second wells is higher than any other structure on the first surface of the second substrate. Spacing between the first and second substrates may be completely provided by the first and second wells. The second replicated structure may include a second lens surface completely in each of the plurality of second wells.

The optics block may include a second replicated structure on the second surface of the first substrate, the second replicated structure including a plurality of second wells and a second lens surface completely in each of the plurality of second wells, such that an upper surface of the second wells is higher than a top of the second lens surfaces.

Some of the embodiments may be directed to a method of forming an optics block, including providing a substrate having first and second opposing surfaces, the substrate being a first material and having a plurality of through holes extending in the substrate between the first and second opposing surfaces, providing a second material, different than the first material, filling a portion of the through holes and extending on a portion of the first surface of the substrate outside the through holes, and replicating a first lens structure in the second material and corresponding to each of the through holes.

Providing the second material may include encapsulating the substrate with the second material.

The method may include providing a third material, different than the first material, extending on a portion of the second surface of the substrate outside the through holes and covering the through holes. The second material and the third material together may completely fill the through holes. The second and third material may cover the first and second surfaces of the substrate, respectively. Providing the third material may occur before providing the second material. The method may further include, before providing the third material may, forming a second lens structure that, after providing the third material, covers the through holes. The method may include, before providing the third material, forming aperture stops adjacent the second lens structures on the third material.

Replicating the first lens structure may include replicating a first lens surface adjacent the first surface and in the second material and replicating a second lens surface adjacent the second surface and in the third material. Replicating the first and second lens surfaces may be simultaneous or sequential. The second and third materials are the same.

Some of the embodiments may be directed to an optics block, including a substrate with a plurality of wells, the substrate being a first material, each well having a bottom surface and sidewalls, and a convex lens surface in each of the plurality of wells, the convex lens surface being in a second material different than the first material and opposite the bottom surface. A bottom of the well may be planar or may include a base optic surface, e.g., at least one of a diffractive surface, a refractive surface, and a reflective surface. Sidewalls of the wells may be treated to block light or suppress reflection.

BRIEF DESCRIPTION OF THE DRAWINGS

The devices and methods described herein are best understood when the following description of several illustrated embodiments is read in connection with the accompanying drawings wherein the same reference numbers are used throughout the drawings to refer to the same or like parts. The drawings are not necessarily to scale; emphasis has instead been placed upon illustrating the principles of the described embodiments.

FIGS. 15A-15H are cross-sectional side views of stages in a method of forming replicated lenses in through-hole wells according to a variant embodiment.

DETAILED DESCRIPTION

Figure 1A:
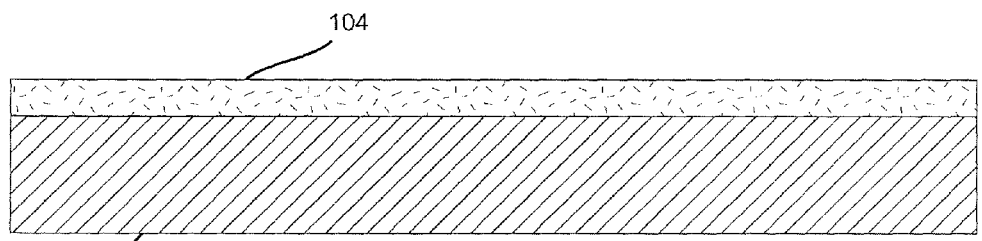
FIGS. 1A-1C illustrate cross-sectional side views of stages in a method for lens replication.
Figure 1B:
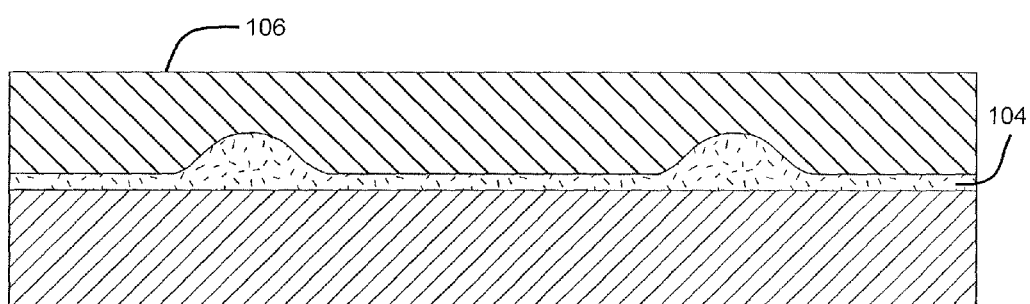
Figure 1C:
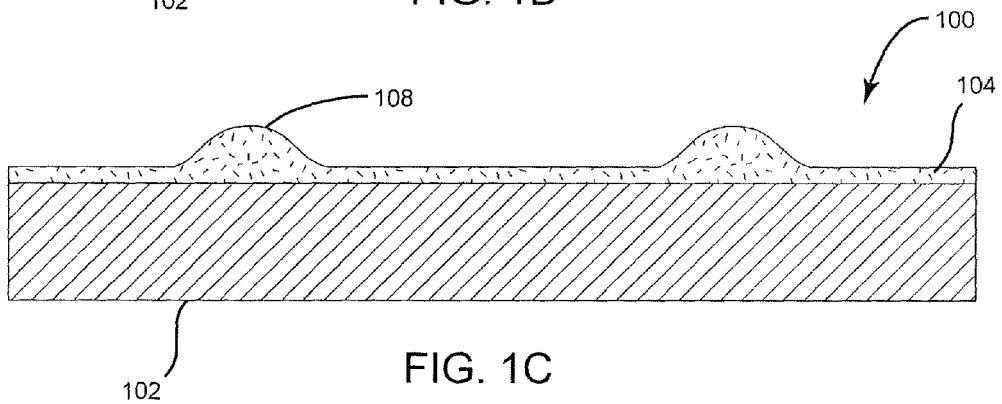
Figure 1D:
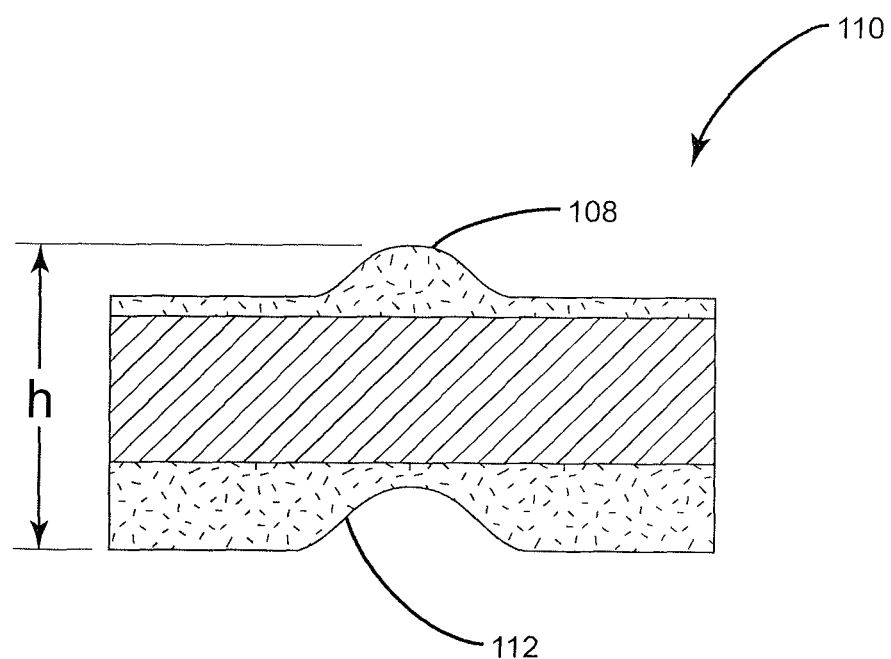
FIG. 1D is a cross-sectional side view of an alternate replicated lens structure.

FIGS. 1A, 1B, 1C, and 1D illustrate a conventional method for creating an array of convex lenses. FIG. 1A shows a cross-section portion of a replication material layer 104 deposited in some manner on the top surface of substrate 102 at an approximate desired thickness or volume. In FIG. 1B, a replication master 106 that has a shape on its bottom surface corresponding to the inverse of the final desired shape is brought down to a known distance from the substrate. While held in this position, the replicated layer 104 is cured, using UV light, heat, time, pressure, or some other method. Thereafter, as seen in FIG. 1C, the master 106 is removed leaving behind lens wafer 100 that has a plurality of lens elements 108 on the surface of substrate 102. The individual dies on the wafer may be separated for immediate use or may be left intact for further processing or attachment to other optical or spacer wafers. Although here is shown formation of lenses on only one side of the substrate, another replicated surface (not shown here, but see FIG. 1D for example) with additional optical activity may be added in a later step to the bottom surface of substrate 102. Alternately, the second replicated surface might be created simultaneously with the first surface 104. Thickness of the lens wafer is equal to the height of the lens replicated layers; their highest point plus the thickness of the substrate. Here the process has been shown for a convex lens, yet the preceding statement remains true for a concave lens formed in the replicated material; the height of the lens replicated layer would then be controlled by the necessity of allowing for sag toward the substrate. An example of this can be seen in FIG. 1D, which shows a singulated lens structure 110 with two lens surfaces 108 and 112 exhibiting both convex and concave lenses. Total height h can be seen to be dependent on both replication layers and the thickness of the substrate.

Figure 2:
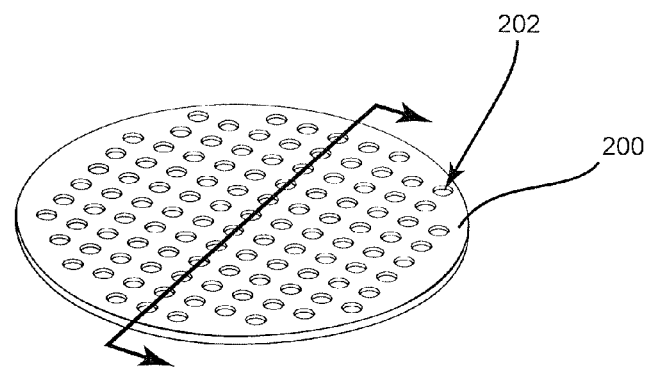
FIG. 2 is a perspective view of a substrate with wells formed in its surface.
Figure 3A:
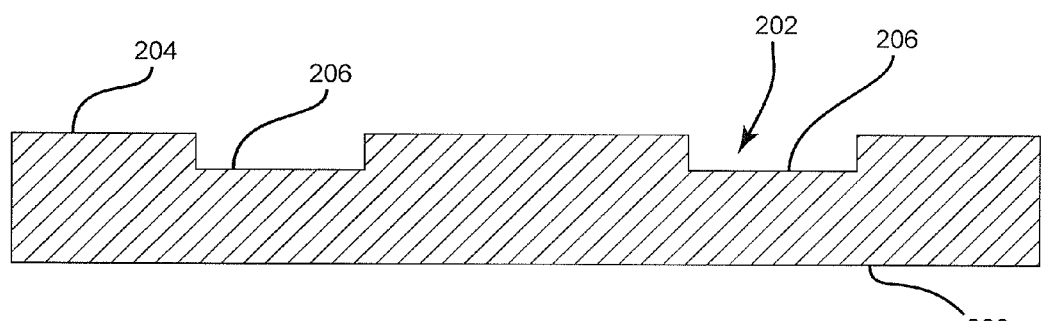
FIGS. 3A-3E are cross-sectional side views of stages in a method of forming replicated lenses according to an embodiment.
Figure 3B:
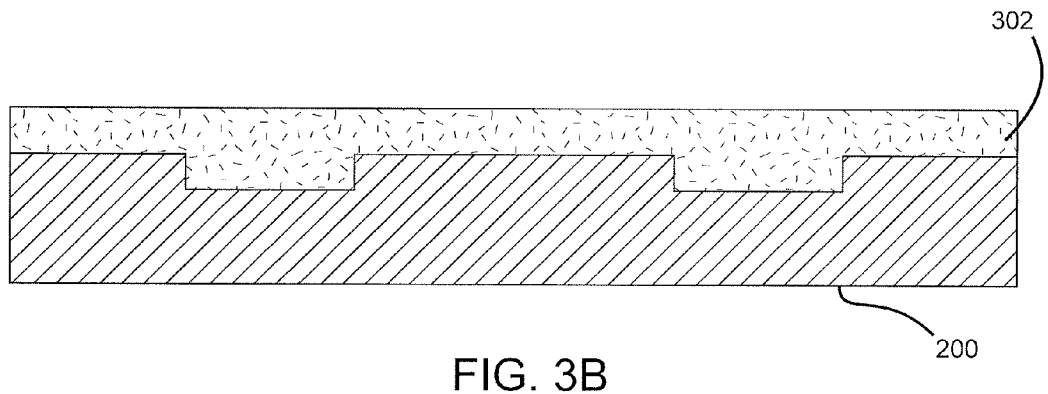
Figure 3C:
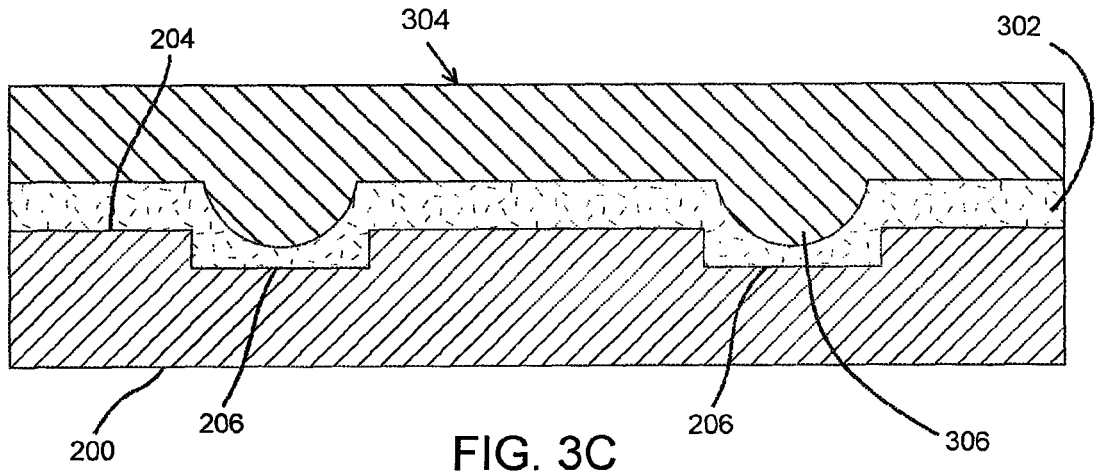
Figure 3D:
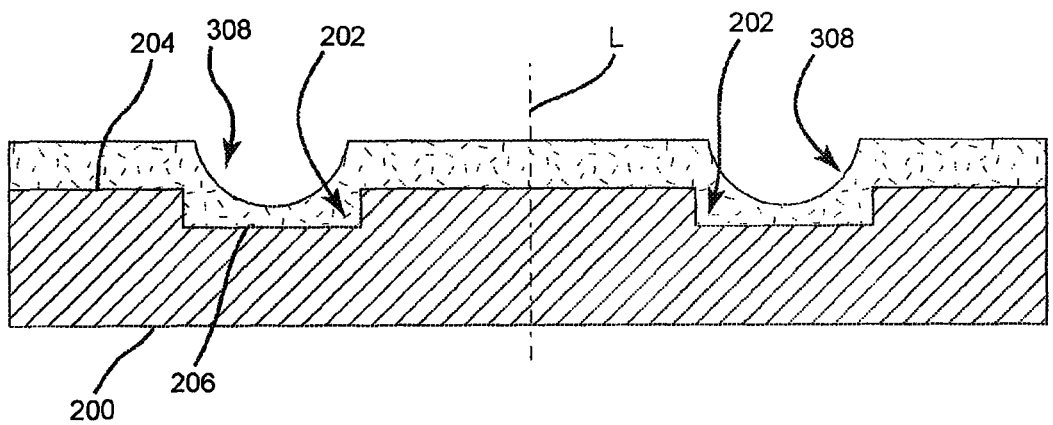
Figure 3E:
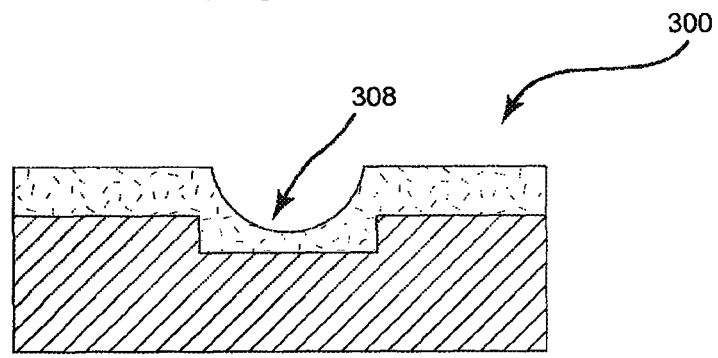

In one embodiment directed at reducing height, lenses are formed over wells formed in a substrate. In this particular embodiment, a concave lens shape is formed, although other shapes or combinations of shapes are possible. The first step of this process is shown in a perspective view in FIG. 2. A number of wells 202 are created in substrate 200. The wells may be etched, drilled, ablated, or formed by some other method. The wells 202 and substrate 200 may be formed simultaneously through a molding process. In this particular illustration, the wells 202 have a depth less than the thickness of the substrate 200. A cross-section of the substrate 200 with wells 202 can be seen in FIG. 3A. In the embodiment shown, the wells 202 extend downward from an upper surface 204 of the substrate 200 and have a substantially planar bottom surface 206. Following this, FIG. 3B shows a replication material 302 placed over substrate 200. The replication material layer may actually be composed of a polymer, a sol-gel, glass, or some other moldable material that can also be set or cured in some manner. It should be noted that the replication material 302 in this figure appears to have a planar top surface, but this is not necessary for this process and here is merely exemplary in that the replication material 302 should generally be distributed relatively evenly across the substrate, and may consist of a preset volume of material 302 that spreads as the mold is applied. The replication material 302 generally does not need to be a conforming layer or a planarizing layer, as its final shape will be dependent on the replication process. FIG. 3C shows a replication master 304 pressed onto the replication material 302. The inversely-shaped lens-forming portions 306 of the replication master 304 are aligned precisely over the wells, and the flat portions of the master are moved to a precise distance from the upper surfaces of the substrate. Upon curing of replication material layer 302, the replication master 304 is removed. The resultant structure, which includes lens elements 308, can be seen in FIG. 3D. This structure may be further processed with additional lens surfaces or singulated along line L to form the lens structure 300 of FIG. 3E.

Without the well 202 in substrate 200, the overall height of the polymer plus the substrate would be greater. Note that the depression forming a concave lens element 308 extends toward the upper surface 204 of the substrate 200 while still maintaining an amount of replication material between the bottom of the lens element 308 and the bottom 206 of the well 202. In the embodiment shown, the lower surface of the lens element 308 lies within the well 202 and below the upper surface 204 of the substrate 200, but there may be times in which optical design principles or practical manufacturing issues dictate that the lowest point on the surface of the lens 308 is higher than the upper substrate level 204. Even under these constraints, the overall height of the lens structure is still less than if the wells 202 in the substrate 200 were not present.

Figure 4A:
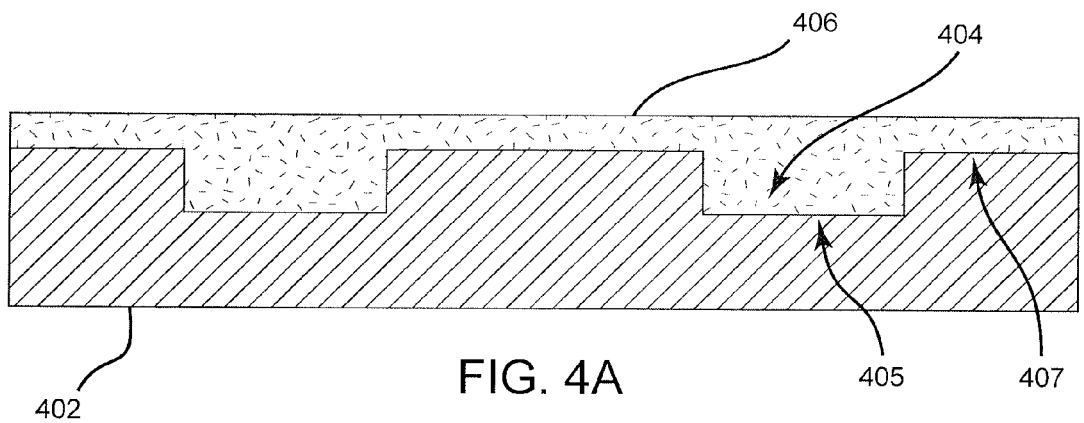
FIGS. 4A-4C are cross-sectional side views of stages in a method of forming replicated lenses according to an embodiment.
Figure 4B:
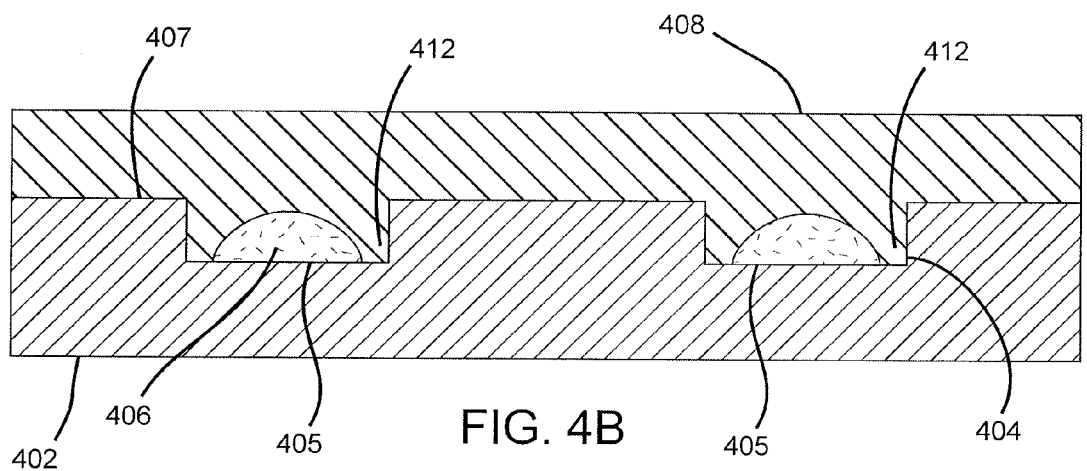
Figure 4C:
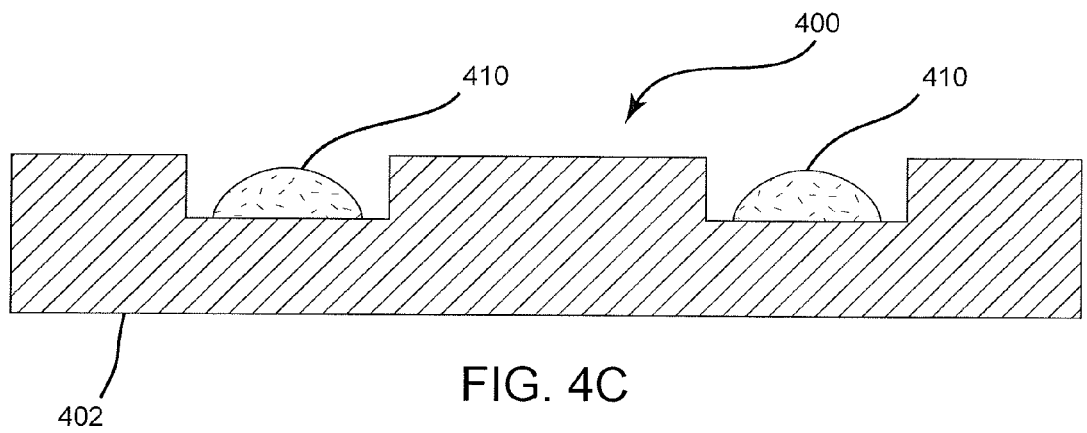

In another embodiment, the lenses can be formed entirely within the wells. This process is illustrated in FIGS. 4A, 4B, and 4C. FIG. 4A shows a layer of replication material 406 deposited over a substrate 402 with wells 404 formed on its surface, the wells 404 being formed with substantially planar bottom surfaces 405. In the embodiment shown in FIG. 4B, a replication master 408 is brought down into contact with the substrate 402. The height of the master 408 and the depth of the wells 404 match closely enough (along with other dimensions) that the protruding lens-forming portions 412 of the master 408 fit into the wells 404 to create the lens shapes 410 in the polymer. The replication material 406 is cured and the replication master 408 is then removed. FIG. 4C shows the resulting lens assembly 400 that may be processed further or diced to create an individual component. In the process as shown in FIGS. 4A-4C, the master 408 is in contact with the substrate 402 at both the upper level 407 of substrate surface and the lower level surface 405 of the substrate wells 404. After curing, this leaves little replication material 406 behind to get in the way of later potential bonding or alignment steps. To achieve this it may require careful control of the amount and positioning of the replication material 406; rather than depositing the replication material 406 over a large portion of substrate 402, a precise amount may be put into each well 404.

Figure 4D:
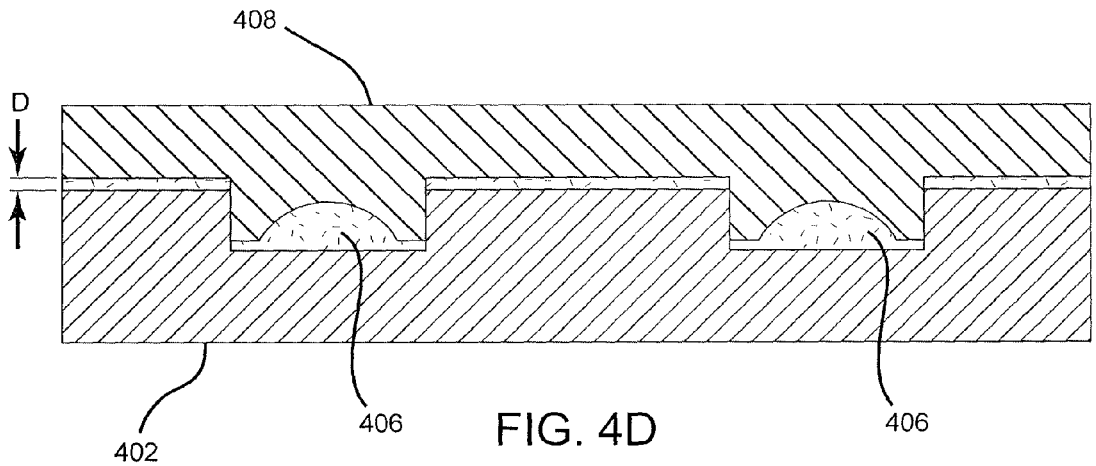
FIGS. 4D-4G are cross-sectional side views of alternative structures according to an embodiment adapted for forming replicated lenses using the process of FIGS. 4A-4C.
Figure 4E:
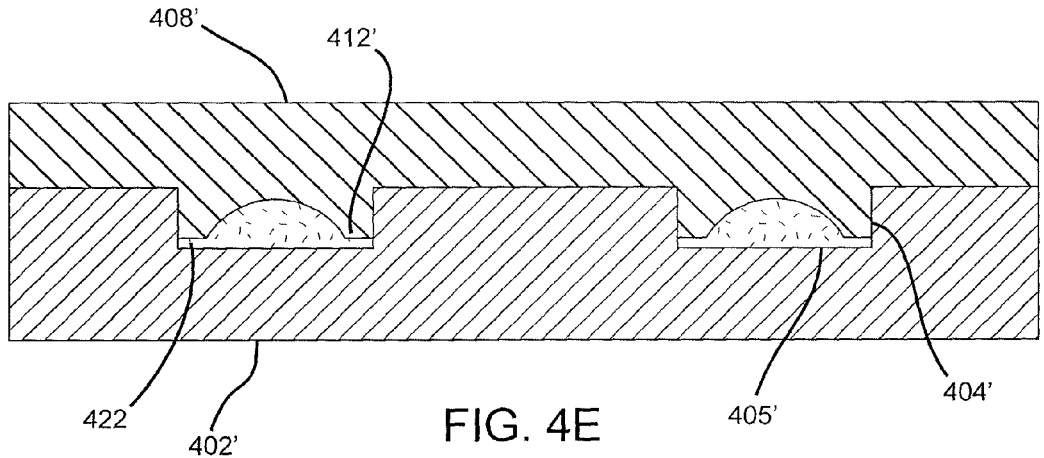
Figure 4F:
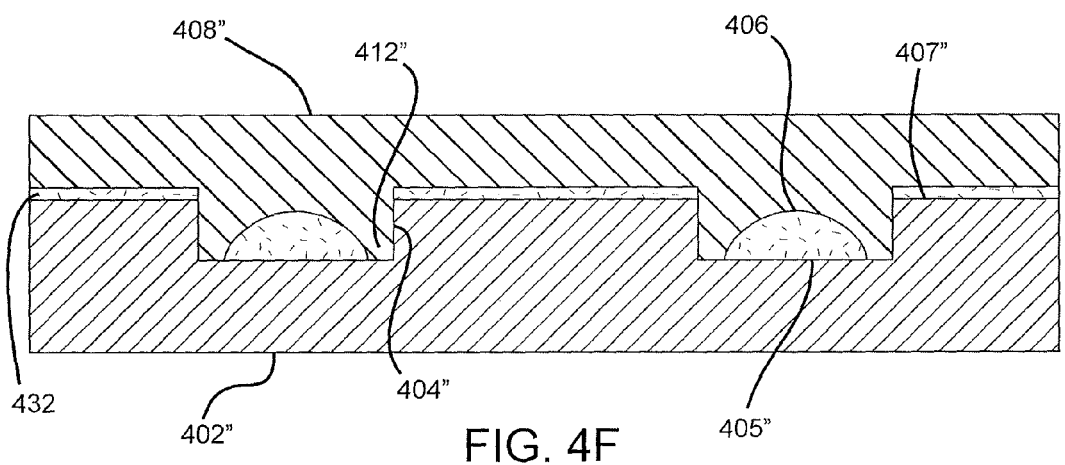
Figure 4G:
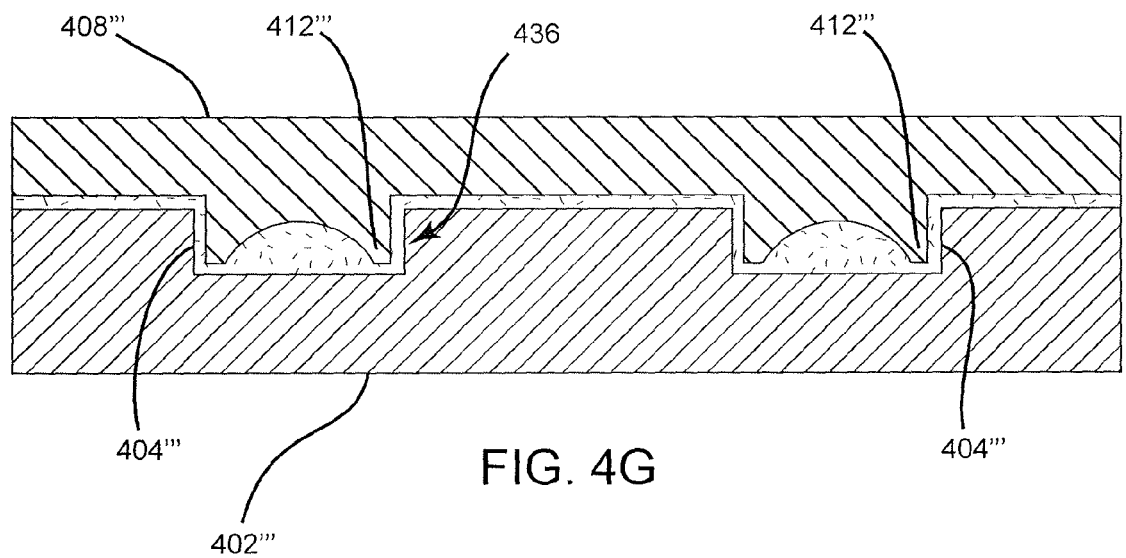

FIGS. 4D, 4E, 4F, and 4G show several variants to the replication process pictured in FIGS. 4A-C. In FIG. 4D, the replication master 408 is lowered to a precise distance D away from the substrate 402 and held there while curing. This may allow looser tolerances to various dimensions of the parts as well as allowing some room for the replication material 406 to flow. In another variant, FIG. 4E shows the replication step where the relative heights of the well 404' and the protruding lens-forming portions 412' of replication master 402' have been changed to allow a gap between the master 402' and the bottom 405' of the well 404'. The relative change might be made by either decreasing the height of the lens-forming portions 412' or by increasing the depth of the wells 404'. In this variant, a thin extra layer 422 of replication material is left behind around the formed lens surface in a place that is normally outside the lens aperture while the master 408' contacts the upper surface 407' of the substrate 402'. FIG. 4F shows yet another variant characterized by changes in relative heights of the lens forming portions 412" on the replication master 408" and the depths of the well 404" lower surface 405". In this embodiment, a thin layer 432 of replication material 406 remains on the upper surface 407" of the substrate 402". In one more variant shown in FIG. 4G, the master 408''' is held at a precise distance away from the substrate 402''' while the replication material 406 is being cured. In this embodiment, the lens forming portions 412''' and wells 404''' are sized so that a gap exists between the lens forming portions 412''' of the master 408''' and the wells 404''' of the substrate 402''' at both the bottom of the wells 405''' and also the sides of the wells 436.

Figure 5A:
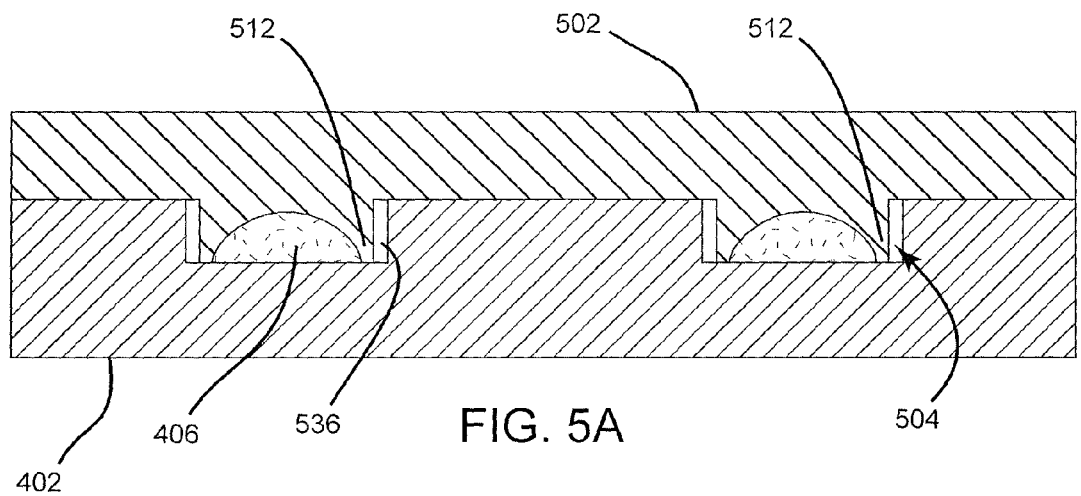
FIGS. 5A and 5B are cross-sectional side views of stages in a method of forming replicated lenses according to an embodiment.
Figure 5B:
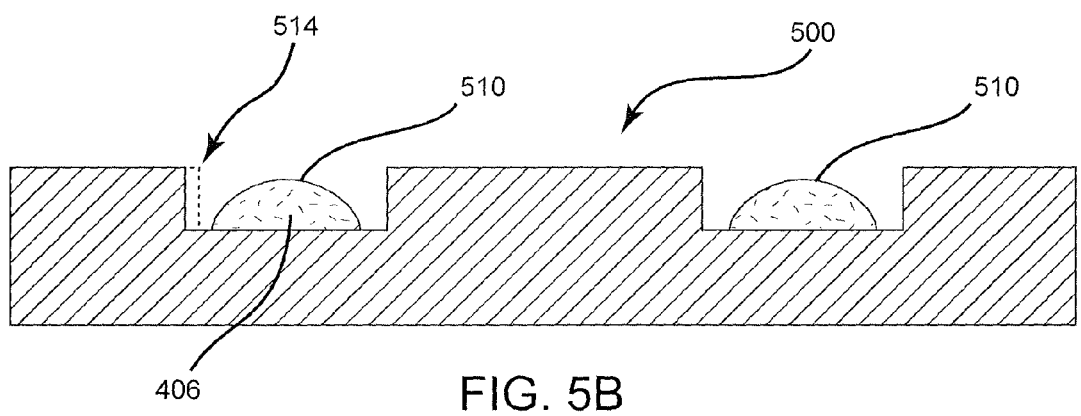

In embodiments described above, the height of the lens-forming portions 412 and the depth of the wells 404 varied in relation to one another. In other embodiments, the width of the lens-forming portions 412 or wells 404 may vary to leave a gap between the sides of the lens-forming portions 412 and the side wall of the wells 404. FIG. 5A shows the replication step of one embodiment. Replication master 502 has lens-forming portions 512 that are narrower than the wells 504 in which lenses are formed leaving the gaps 536 near the sides of the wells 504. The final lens structure 500 can be seen in FIG. 5B. Although the replicated lens elements 510 might appear very similar to those seen in FIG. 4C, it is also possible, depending on the amount of replication material deposited in the wells that the corners 514 of the wells may also have some remaining material in them, in some cases extending up to the substrate surface entirely filling the original gaps 536. Variants equivalent to those shown in FIGS. 4D, 4E, 4F, and 4G may also be performed on this embodiment.

Figure 6A:
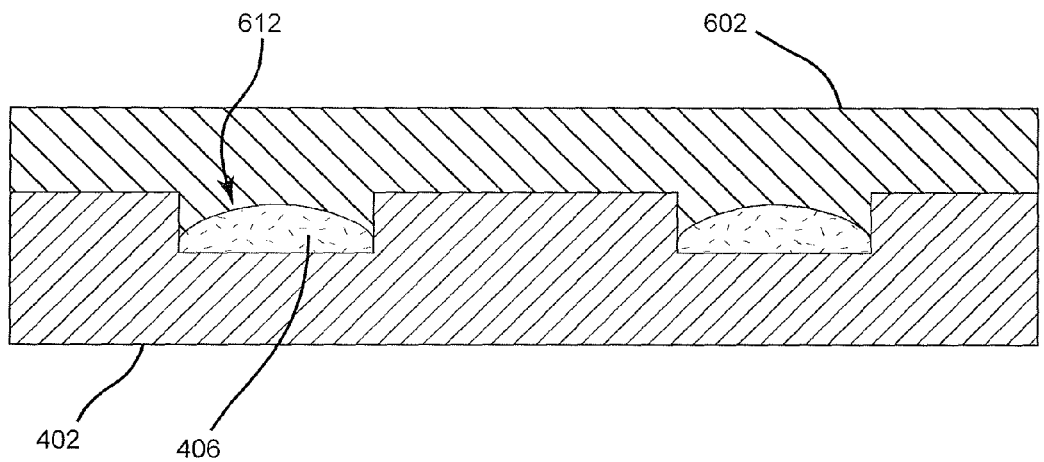
FIGS. 6A and 6B are cross-sectional side views of stages in a method of forming replicated lenses according to an embodiment.
Figure 6B:
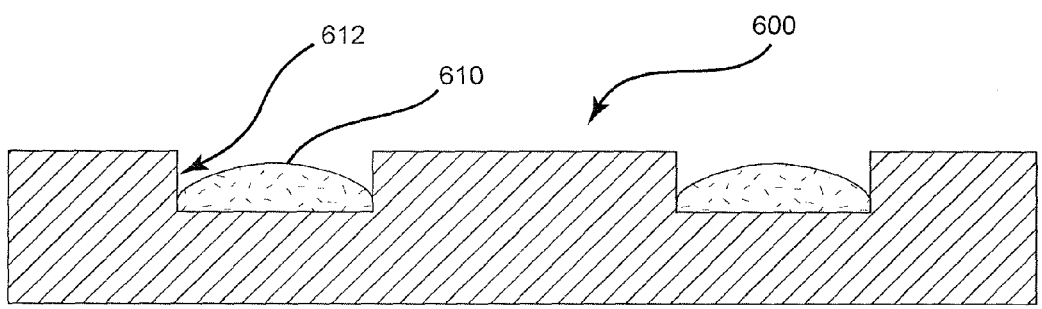

In another embodiment, the active area of the lenses may be extended near to the edges of the wells. FIG. 6A shows a replication master 602 with lens-forming portions 612 that do not extend down to the bottom of the wells but instead shape the replication material 406 across the entire width of the well. The resulting lens structure 600 can be seen in FIG. 6B. The sides 612 of the well may act as apertures for the lens elements 610, however other portions of an assembled lens may be positioned to better act in that capacity.

Figure 7A:
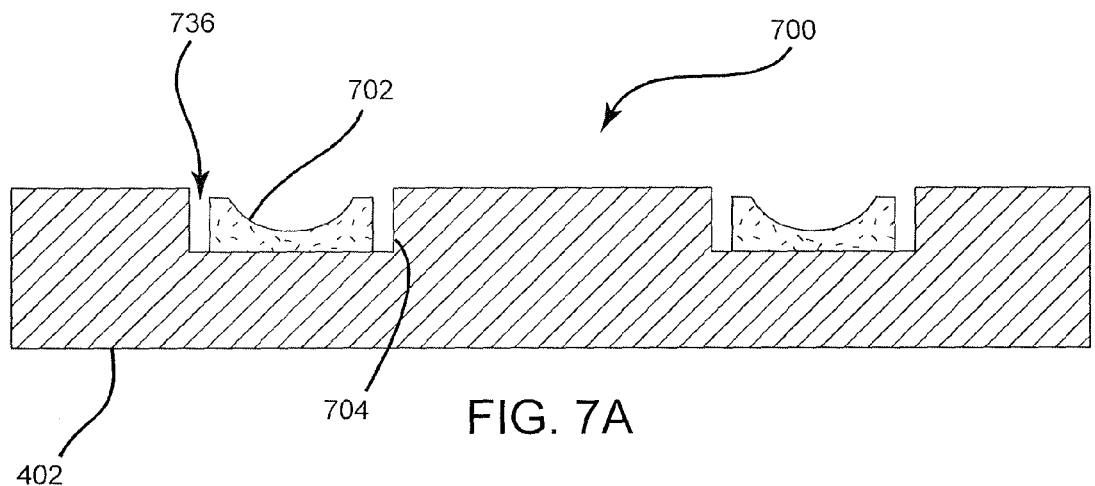
FIGS. 7A-7C are cross-sectional side views of several concave lens element structures according to an embodiment formed utilizing techniques from several embodiments disclosed herein.
Figure 7B:
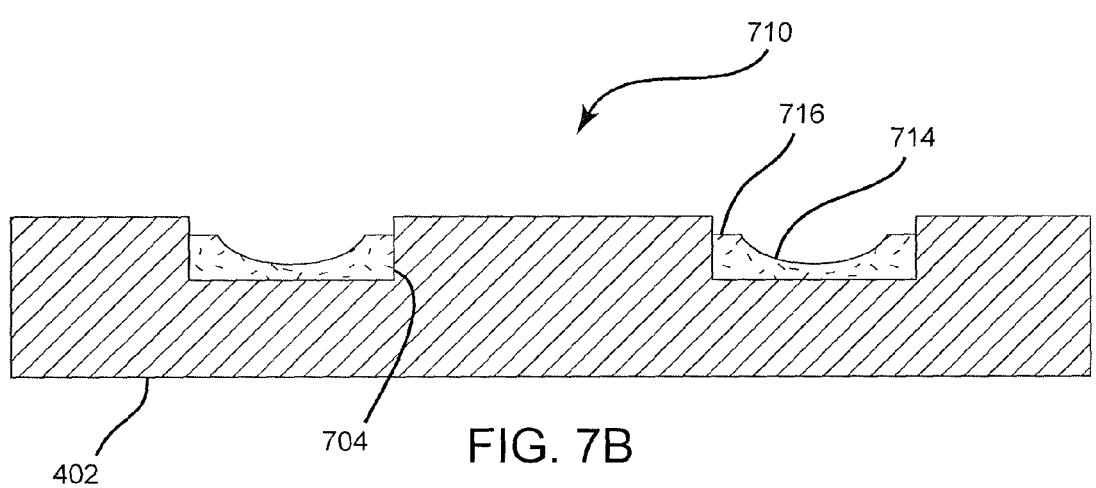
Figure 7C:
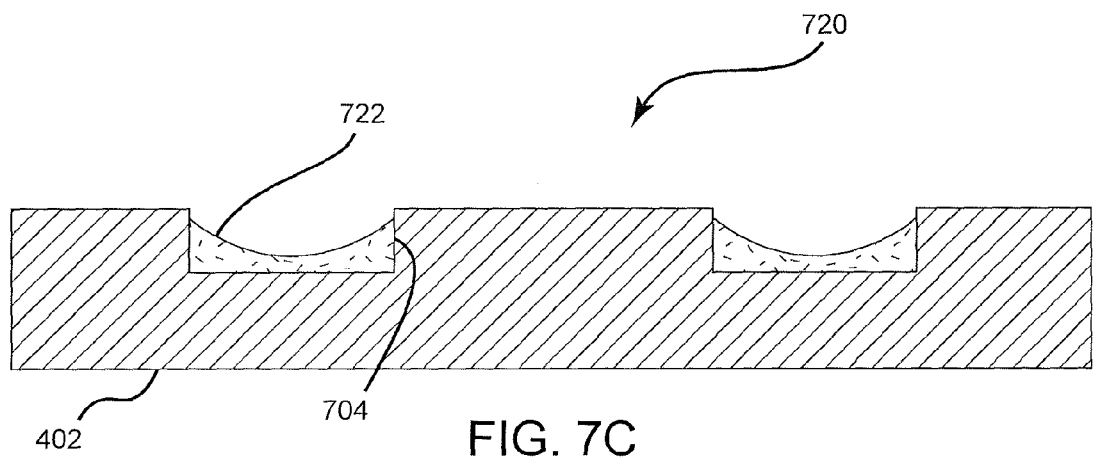

In previously described embodiments, convex lenses were created according to the methods outlined therein, but these techniques are equally usable in creating concave lenses. FIG. 7A displays a lens assembly 700 with concave lens elements having a gap 736 between the lens elements 702 and the side of the wells 704. FIG. 7B shows a lens assembly 710 where lens elements 712 extend to the edge of the well 704, but the optically active curved portion 714 of each lens element 702 only covers a portion of the well 704. An inactive portion 716 of the replicated lens elements 712 fills the remaining portion of the well 704 surrounding the active portion 714. FIG. 7C shows a lens assembly 720 where the lens elements 722 extend to the side of the well 704 including the lens element surface.

In embodiments described hereto, curved optical surfaces have been described as being refractive. This is particularly the case where light is intended to pass through the surface. In other implementations, the curved surfaces may be reflective in nature. Reflective optical features, either concave or convex, may be made with similar replication methods. Reflective optics might be made by replicating substantially opaque or reflective materials, by replicating lenses in substantially reflective substrates, or by coating reflective materials over replicated transparent materials.

Figure 8A:
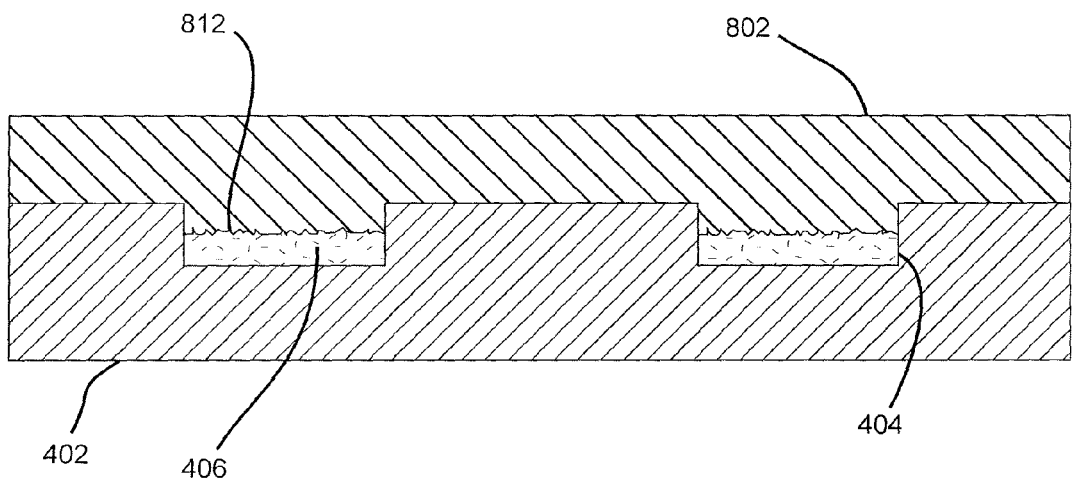
FIGS. 8A and 8B are cross-sectional side views of stages in a method of forming replicated diffractive lenses according to an embodiment.
Figure 8B:
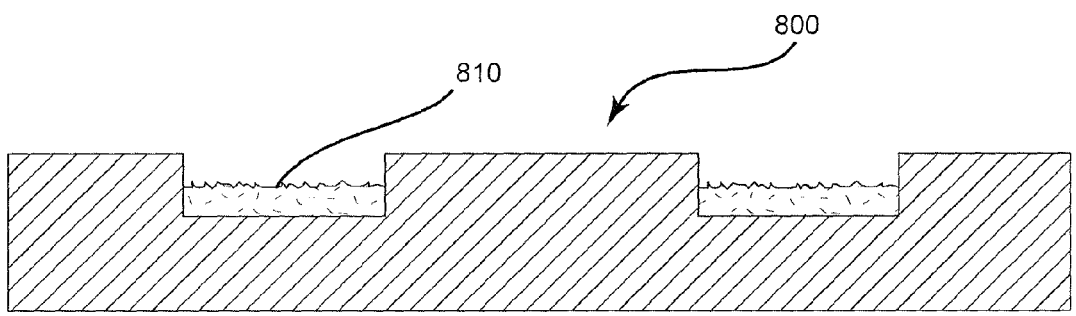

In yet another embodiment, the lens element may be of diffractive rather than refractive optical power. FIG. 8A shows a replication master 802 with lens-forming portions 812 of diffractive shape pressed into the wells 404 of the substrate 402 containing replication material 406. The final lens structure 800 is pictured in FIG. 8B, where lens elements 810 can be seen to have an exemplary diffractive shape.

Figure 9A:
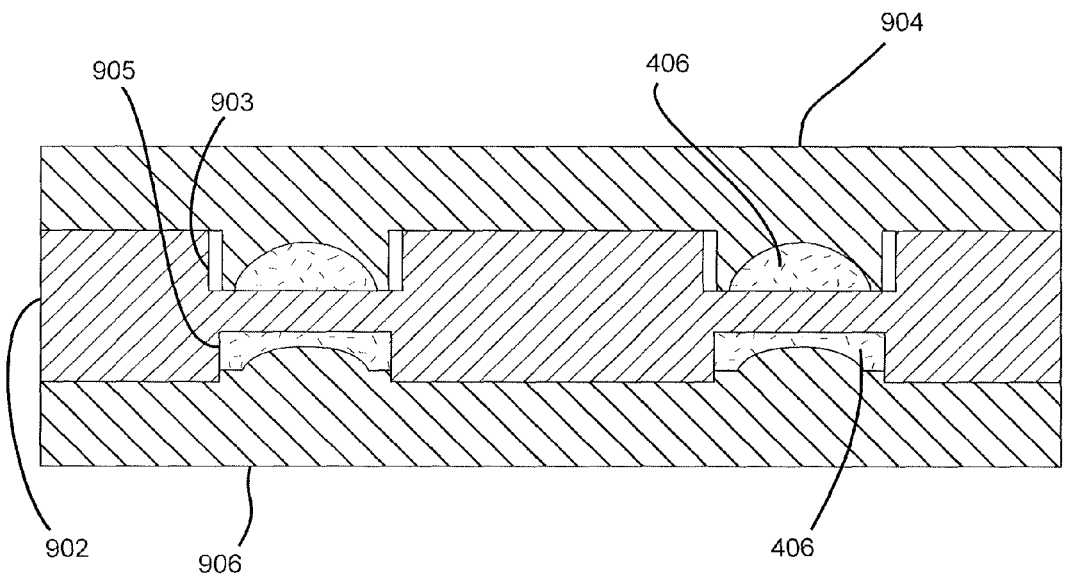
FIGS. 9A and 9B are cross-sectional side views of stages in a method of forming a dual-sided replicated lens structure utilizing techniques from several embodiments disclosed herein.
Figure 9B:
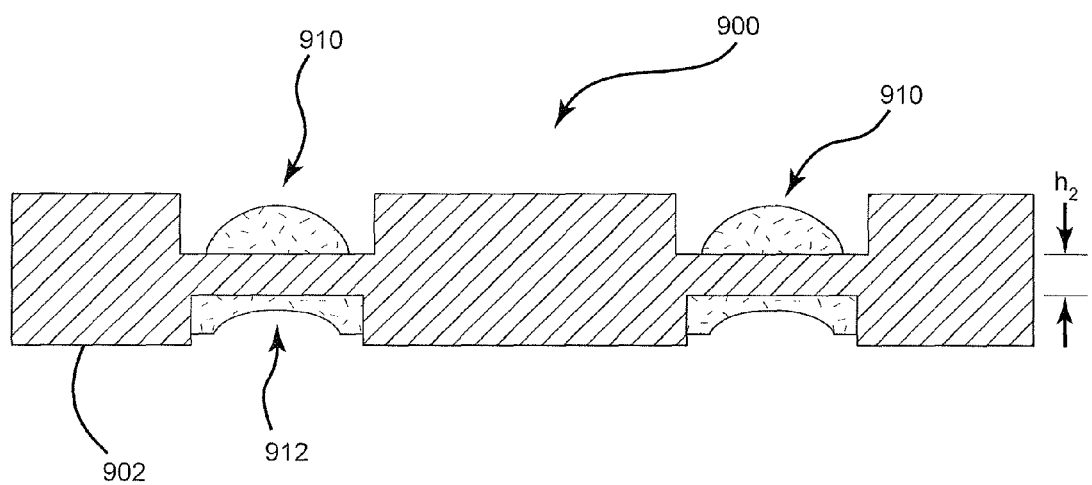

Although the preceding embodiments only refer to creation of lenses on a single side of the substrate, in yet another embodiment, a second lens array on the other side may be added subsequently or simultaneously. FIG. 9A illustrates one exemplary procedure wherein two sides are formed in one operation, although any of the preceding styles of lenses might be used to create a dual-lens surface. In FIG. 9A, a substrate 902 is formed with wells on each side with opposing wells 903, 905 aligned to each other so that at least a portion of the clear aperture of the upper well 903 is aligned with the clear aperture of the lower well 905. After coating both sides with a replication material 406, an upper replication master 904 and a lower replication master 906 form the replication material 406 into lens surfaces. It may be impractical to coat the bottom side of the substrate with the replication material along with the top side, and so instead the top surface of the lower replication master 906 may have the replication material 406 deposited on its top surface. In any case, the intermediate product will appear similar to the structure of FIG. 9A. Removal of both of the masters 904, 906 will leave behind lens structure 900, which can be seen in FIG. 9B. The variety of lens shapes and sizes is only limited by the optical design required. Lenses 910 on the upper surface of the substrate 902 need not have the same width or positioning as those lenses 912 on the lower surface of the substrate 902. Additionally, the replication materials 406 used for the upper 910 and lower 912 lens elements may be the same or different substances. In this example, convex and concave lenses are seen mounted on the same substrate, but any combination of these is possible. With an additional lens surface on the substrate, even greater reductions of the overall thickness are present here compared to these lenses formed on a substantially flat substrate. Also note in this example that optically the lens system is equivalent to that of both lens elements being replicated on a substrate with thickness $h_2$ instead of the thickness of the entire substrate. Structural and other constraints may make it difficult to accomplish lens replication and other processing steps on such a uniformly thin substrate. In contrast, this embodiment should retain the structural integrity and strength of the thicker substrate during processing and after lens assembly 900 singulation and packaging.

Figure 10A:
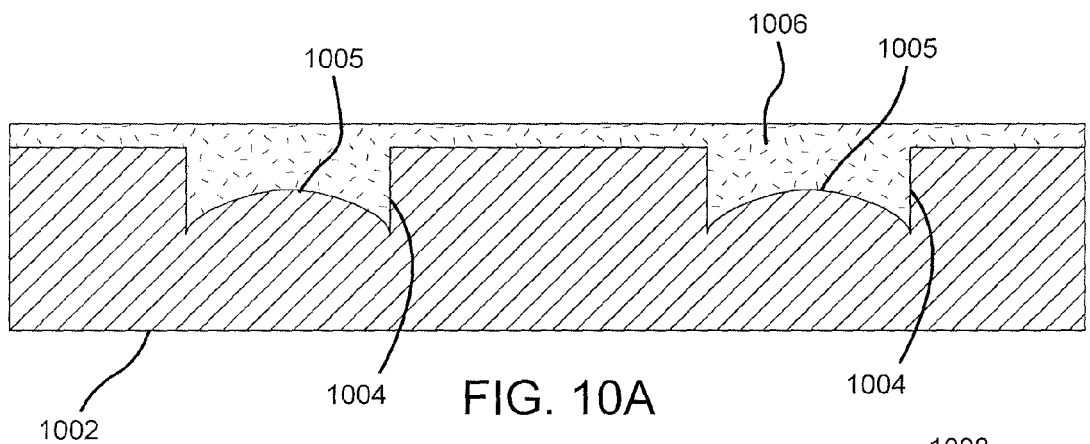
FIGS. 10A-10C are cross-sectional side views of stages in a method of forming replicated lenses over other curved surfaces according to an embodiment.
Figure 10B:
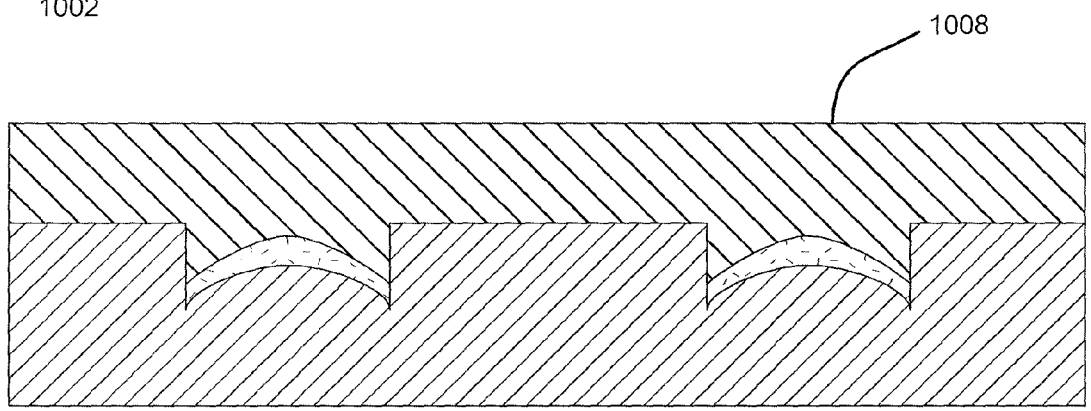
Figure 10C:
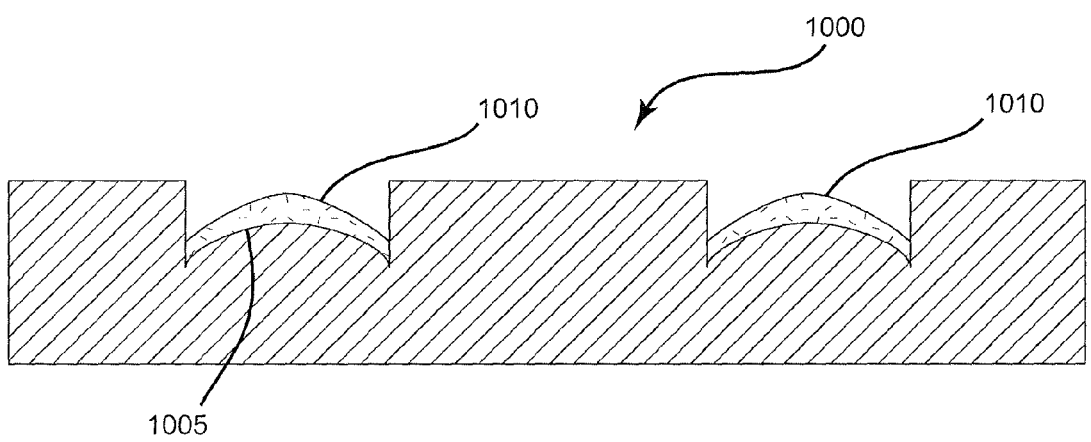

In preceding embodiments, the bottom surface of the well in the substrate has been substantially planar. In other embodiments, the bottom surface of the well can be given a curved shape so that it has optical power on its own. FIG. 10A shows a substrate 1002 in which wells have been formed. Inside the wells 1004 are curved bottom surfaces 1005. The curved surfaces 1005 may be formed after the wells 1004 have been created or may have been created during the process of forming the wells 1004 themselves by etching or some other known process. In the embodiment shown, curved surfaces 1005 are formed directly from the substrate 1002 material. In other embodiments, the curved surfaces 1005 may be formed of a different material, including for example a replication material 1006. For the illustrated embodiment, a layer of replication material 1006 is deposited on top of the substrate 1002. In FIG. 10B, a replication master 1008 forms lens element surfaces from the replication material 1006. FIG. 10C shows lens structure 1000, where lens elements 1010 have been left behind overlying the curved surfaces 1005. If the replication material 1006 has a substantially similar index of refraction and other optical properties (such as dispersion) as that of the substrate 1002 material, then curved surfaces 1005 will have little optical effect at the replication/substrate interface, but they may still aid in shaping the replicated portion 1010 of the lens into a shape it might otherwise be difficult for the material to create. However, if the index of refraction or other properties are substantially different, then the interior surface 1005 will also have optical power as well even if more optical power is retained at the solid/air interface at surface of lens elements 1010.

Figure 10D:
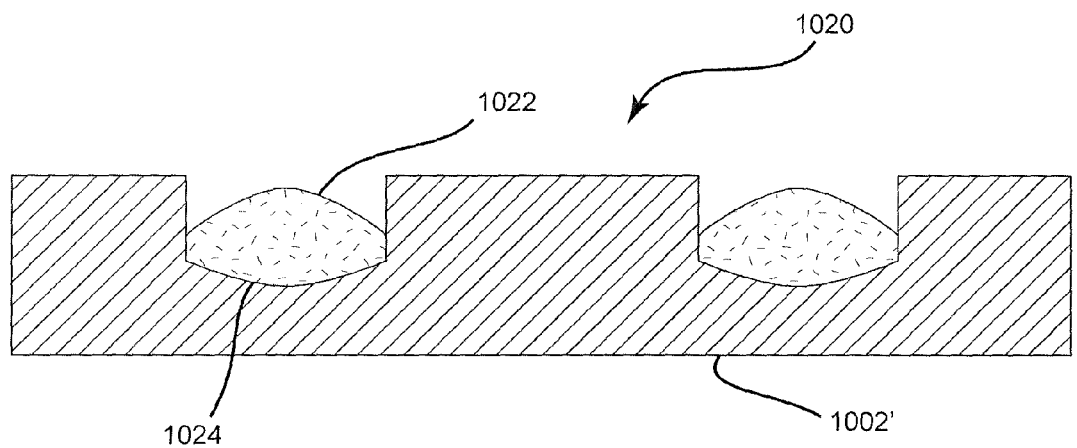
FIGS. 10D and 10E are cross-sectional side views of alternative structures according to an embodiment formed using the process of FIGS. 10A-10C.
Figure 10E:
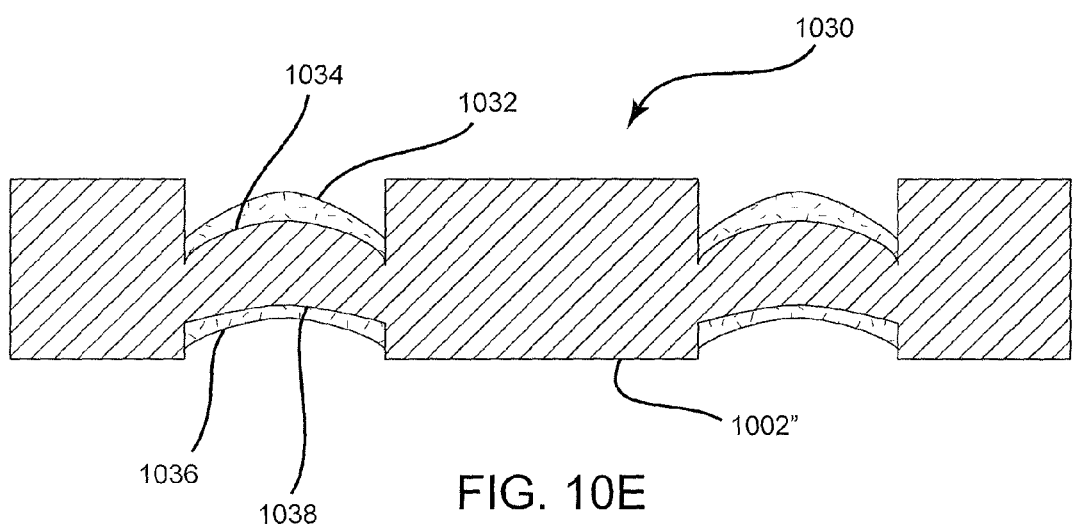

FIG. 10D illustrates a variant of this embodiment here shown as lens structure 1020, wherein the curved surfaces 1024 on the substrate can be of substantially opposite refractive power to the replicated curved surface 1022. Similar to other embodiments, these methods may be applied to both sides of the substrate 1002'. FIG. 10E shows a lens structure 1030, which has four surfaces in the optical path (1032, 1034, 1036, 1038), all of which may have optical power with proper choice of replication material and substrate 1002" materials and which can be manufactured to have a compact height configuration.

Figure 11A:
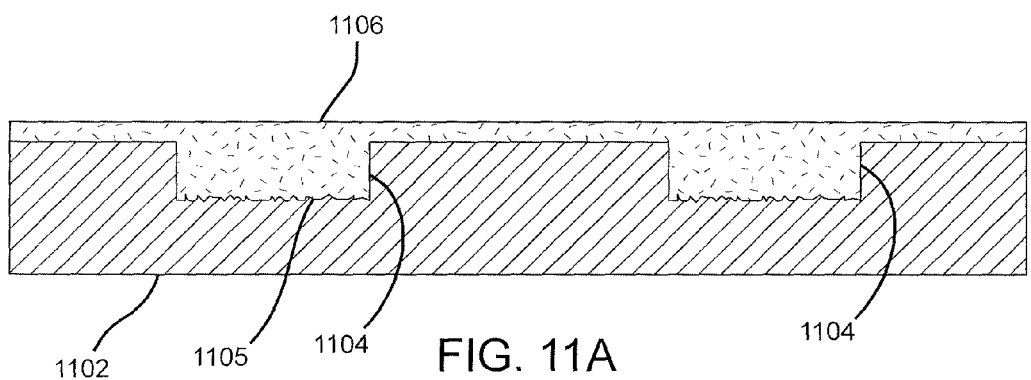
FIGS. 11A-11C are cross-sectional side views of stages in a method of forming replicated lenses over a diffractive surface according to an embodiment.
Figure 11B:
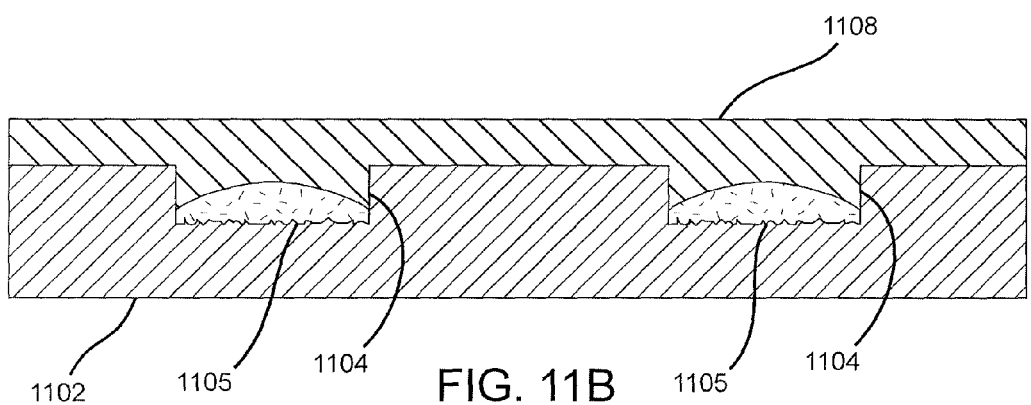
Figure 11C:
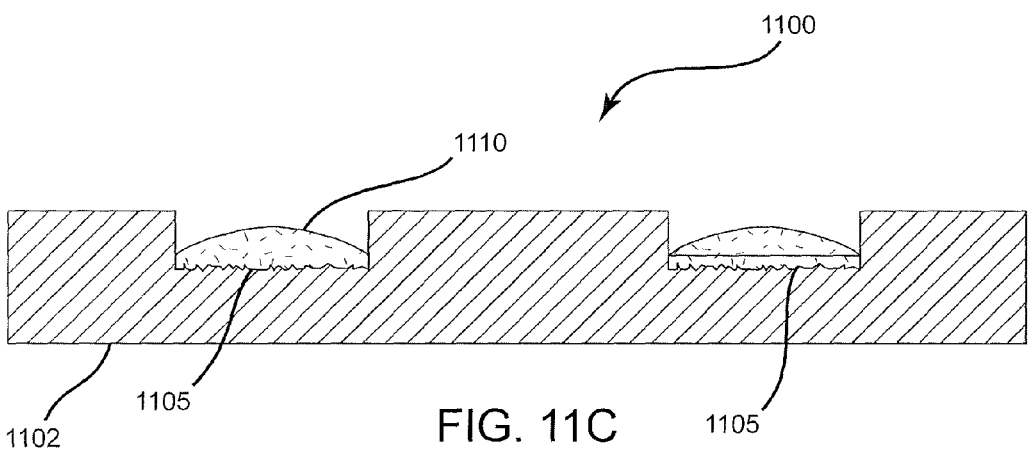
Figure 11D:
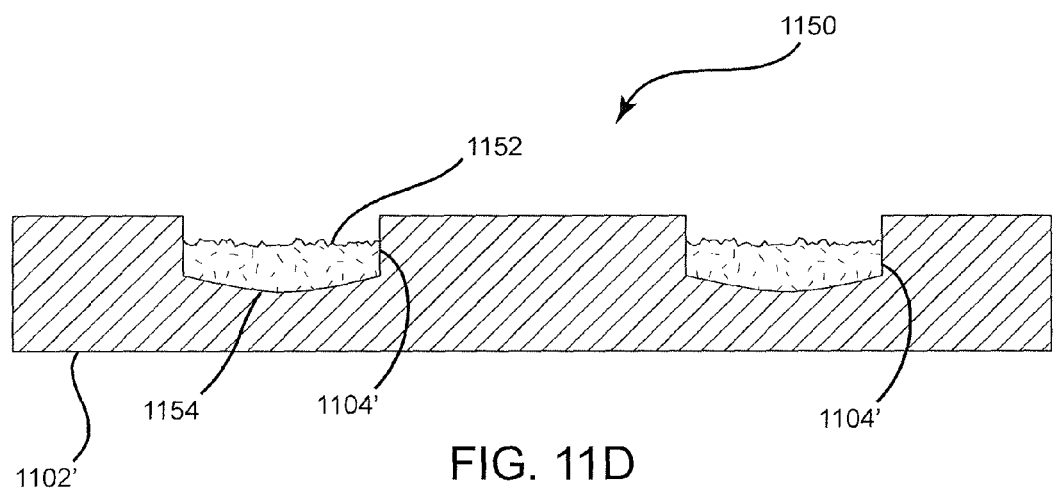
FIGS. 11D-11E are cross-sectional side views of alternative structures including replicated diffractive surfaces over a refractive surface according to an embodiment.
Figure 11E:
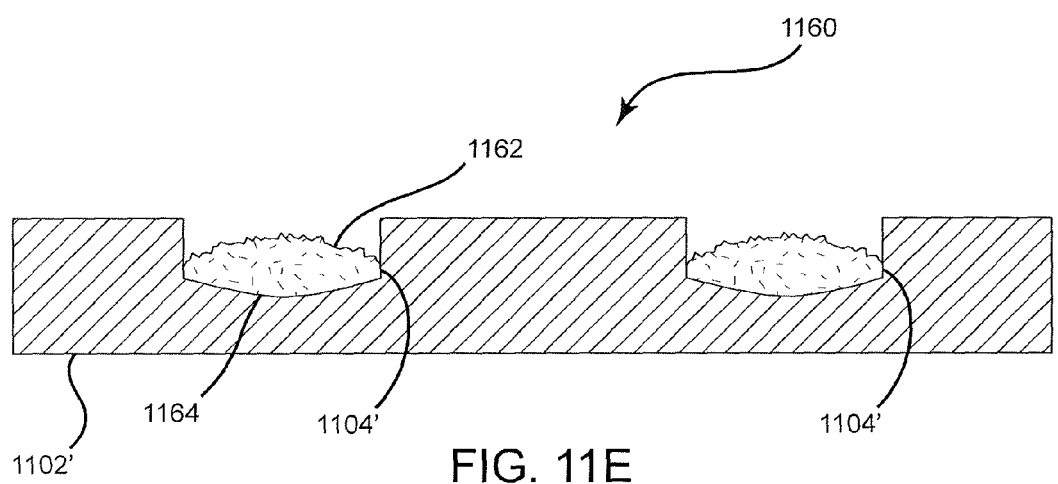

In other embodiments, the bottoms 1105 of the substrate wells are not strictly planar but have a diffractive surface. FIG. 11A displays a substrate 1102 in which wells have been formed. The lower surface 1105 of the wells 1104 is shaped to have a desired diffractive shape. A layer of replication material 1106 is then distributed on top of the substrate. FIG. 11B shows a replication master 1108 forming the diffractive structure within the wells 1104 of the substrate. The resulting lens structure 1100 can be seen in FIG. 11C. In this structure 1100, lens elements 1110 with refractive power are disposed above diffractive surfaces 1112. As with other embodiments, other lens shapes could be created above the diffractive surfaces, and both sides of the substrate could be treated simultaneously or subsequently in the same manner, including various combinations of refractive and diffractive lens portions on substrate or replicated surfaces. FIG. 11D shows a variant of this embodiment, wherein lens structure 1150 has the order of these types of elements reversed; here the diffractive surface 1152 is replicated overlying a curved surface 1154 inside the well 1104' in substrate 1102'. FIG. 11E shows another variant of this embodiment, wherein the lens structure 1160 has a replicated lens surface 1162 overlying the curved lower surface 1164 of the well 1104' in substrate 1102'. In this variant, surface 1162 exhibits both diffractive and refractive behavior.

Figure 12A:
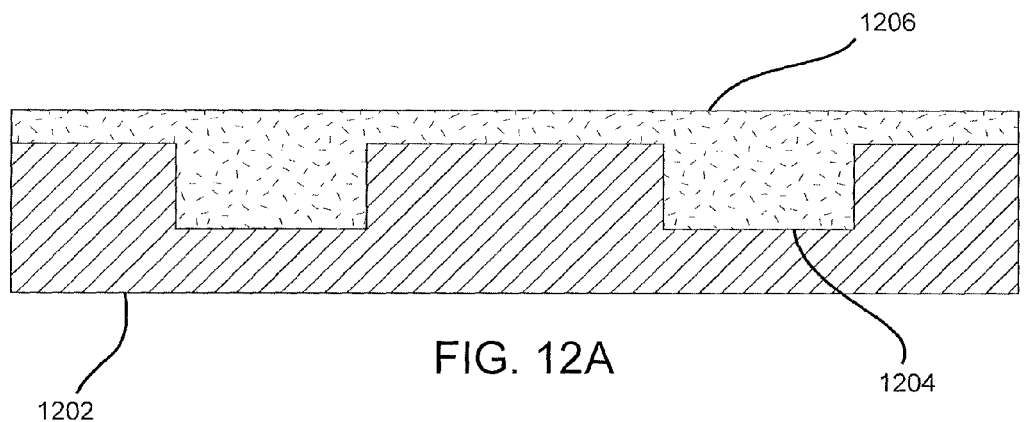
FIGS. 12A-12E are cross-sectional side views of stages in a method of forming multiple stacked replicated lenses according to an embodiment.
Figure 12B:
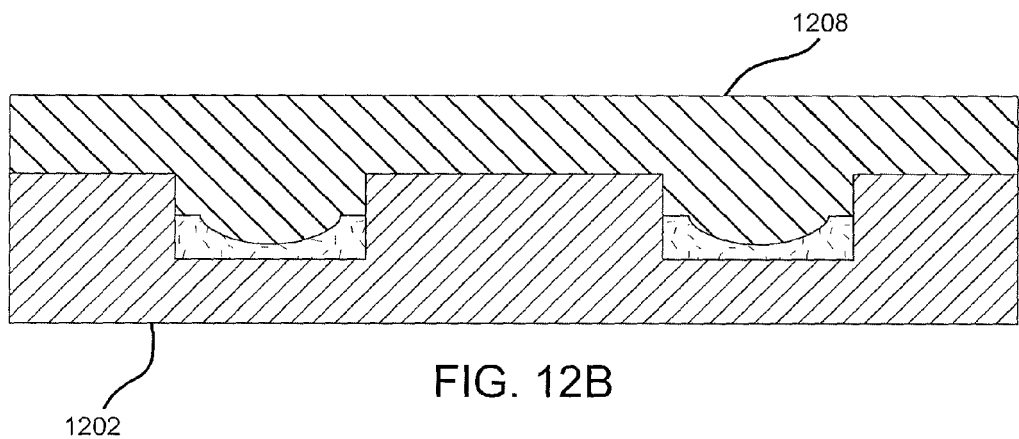
Figure 12C:
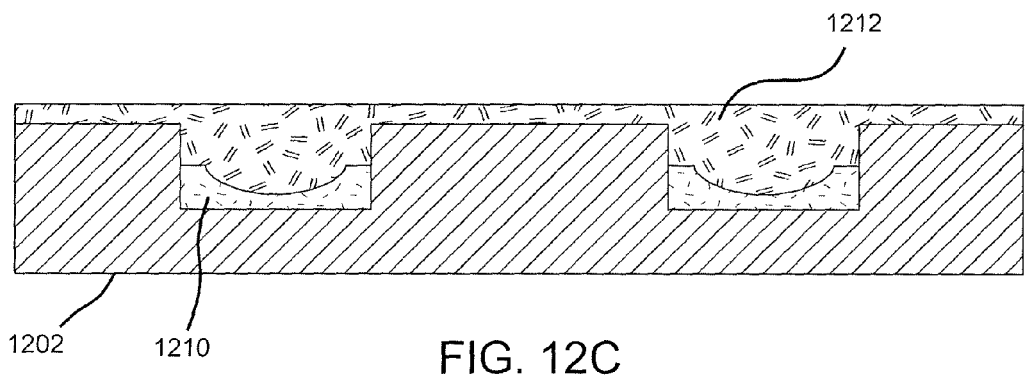
Figure 12D:
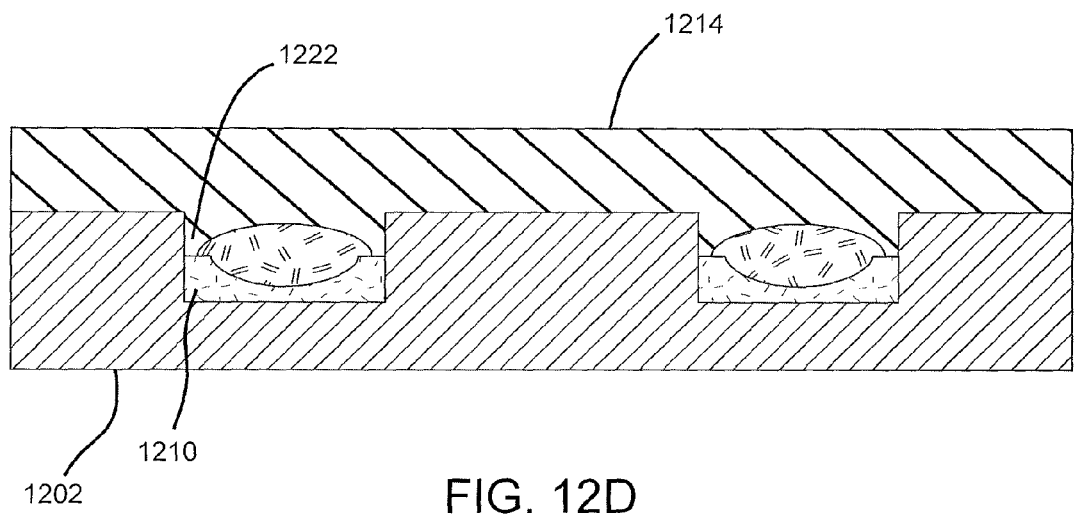
Figure 12E:
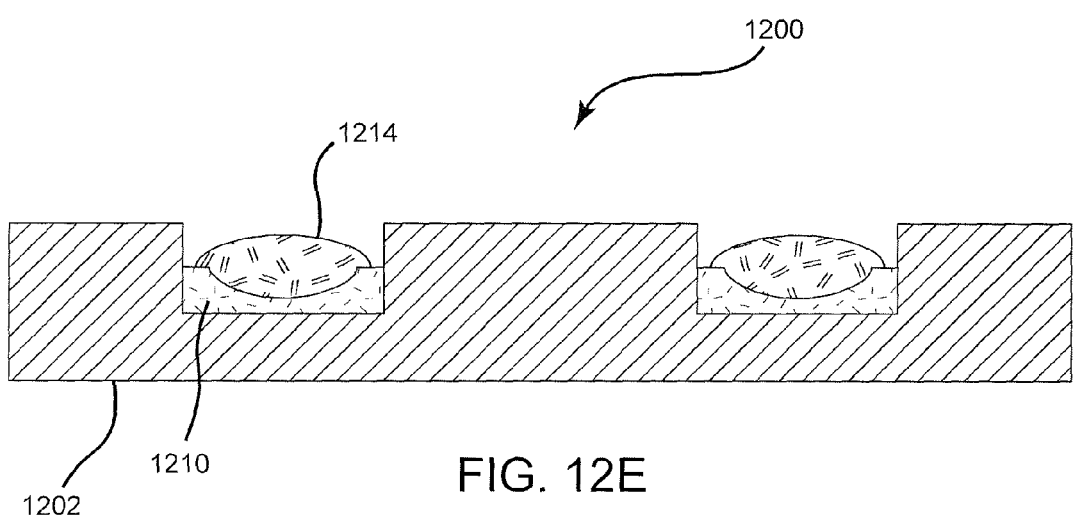

In yet another embodiment, more than one lens surface element can be added to a given well in a substrate. FIG. 12A shows a substrate 1202 with wells 1204 formed in the upper surface. The surface is coated with a first layer of replication material 1206. In FIG. 12B, a first replication master 1208 patterns the replication material 1206. After curing the replication material, the first master 1208 is removed. FIG. 12C shows the substrate 1202 with the first lens element 1210 remaining in the well. A second layer of replication material 1212 is then coated onto the substrate and over the first lens element 1210. The second replication material 1212 is chosen so that it has different optical properties than the first replication material 1206, particularly in the index of refraction. FIG. 12D shows a second replication master 1214 placed on the substrate to shape the second replication layer 1212 but leave the first replicated lens element 1210 unchanged. Although as pictured here the second master 1214 is in contact with both the substrate 1202 and the first lens element 1210, in practice heights of lens forming portions 1222 of second replication master 1214 to avoid touching or otherwise harming the first lens element 1210. FIG. 12E displays lens structure 1200 with two active lens elements 1210 and 1214. Though the process for this lens structure might stop with the two lens elements vertically stacked in order as shown, it is conceivable that a third element could be formed after the second lens element within the same well, and that a third lens element could be formed in the same manner as the second one was formed. Further lens elements might be added into the well in the same manner. In addition, this multi-step process could also create multi-element structures on both sides of the substrate using methods as outlined in previous embodiments.

Figure 13A:
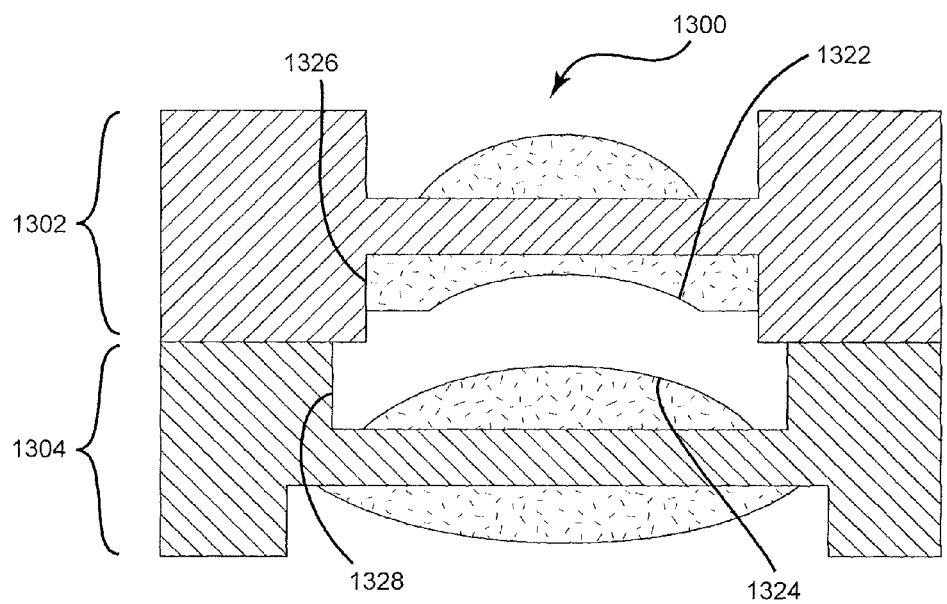
FIGS. 13A-13C are cross-sectional side views of several replicated lens stacks created from lens structures of several embodiments disclosed herein.
Figure 13B:
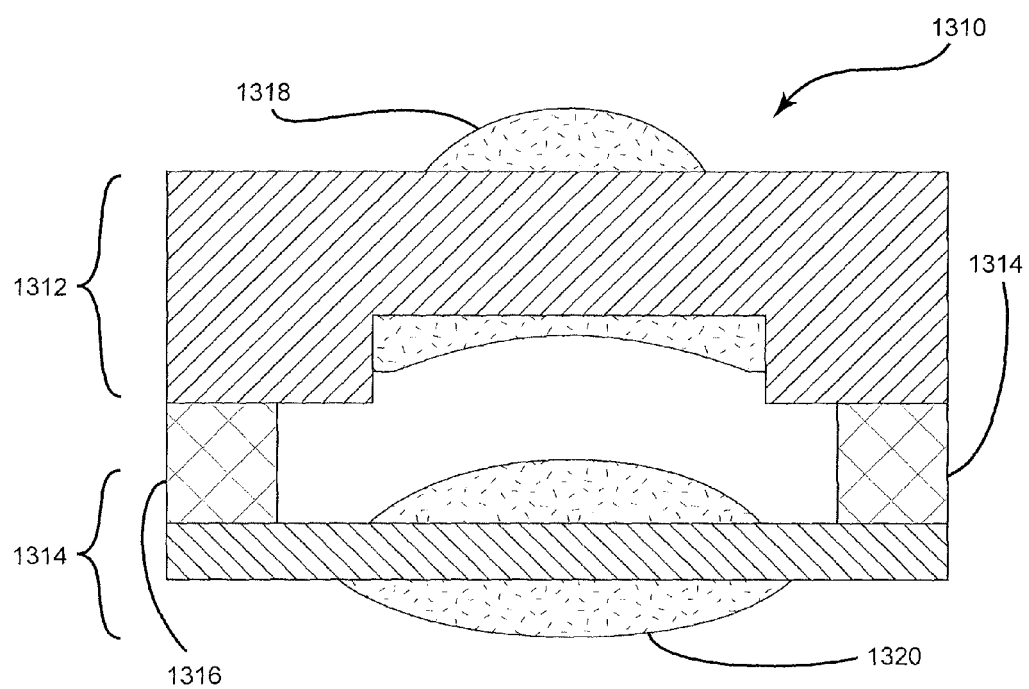
Figure 13C:
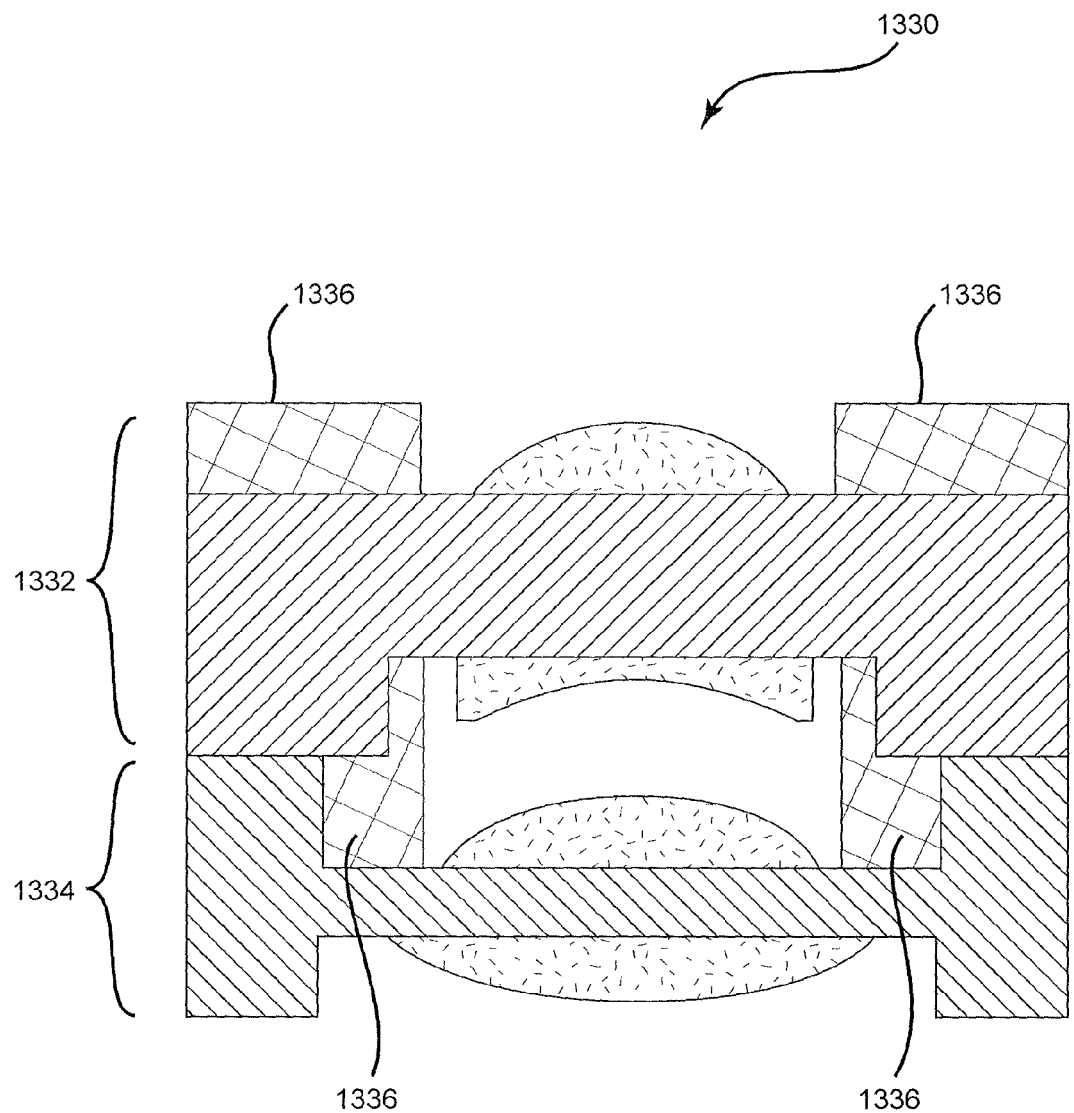

Lens structures may be singulated and used in their current configurations, or they may be processed further by joining them into more complicated lens stack structures. FIGS. 13A, 13B, and 13C show several exemplary embodiments. In FIG. 13A, lens stack 1300 is created from two lens structures 1302 and 1304. In this embodiment, the lens structures are joined without a spacer between them. That is, the spacing between the lens surfaces 1322 and 1324 is established by controlling the replication thickness and controlling the depths of the wells 1326, 1328 in which the lenses 1322, 1324 are replicated. The final structure as pictured here could have been joined at the die level, but more likely the lens structures were joined at a wafer level and then separated to create the lens stack 1300. FIG. 13B shows a lens stack 1310 that has been created from two different lens structures 1312 and 1314. Both of these lens structures contain a lens that was formed on the surface of the substrate using conventional techniques (1318 and 1320) as illustrated in FIGS. 1A-1D. In some cases, optical design or other constraints may make it desirable to include replicated lenses of this design. As FIG. 13B shows, methods and structures of the previous embodiments are compatible and freely mixable with lenses replicated using conventional methods. In the embodiment of FIG. 13B, the lens structures are separated by a spacer wafer 1316 to set the proper distance between internal lens elements. FIG. 13C displays another embodiment as lens stack 1330. Here, lens structures 1332 and 1334 are joined together without the use of a spacer wafer (although one could be provided if this is needed for the optical design). Prior to joining, two layers of a light-blocking component 1336 are added to each lens structure. The light-blocking components may act as apertures for the optical system, or may serve to block stray light from entering the usable light path.

Figure 14A:
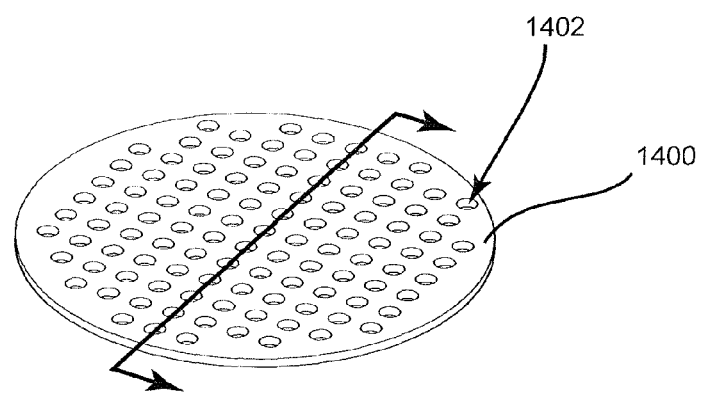
FIG. 14A is a perspective view of a substrate with through-hole wells according to an embodiment.
Figure 14B:
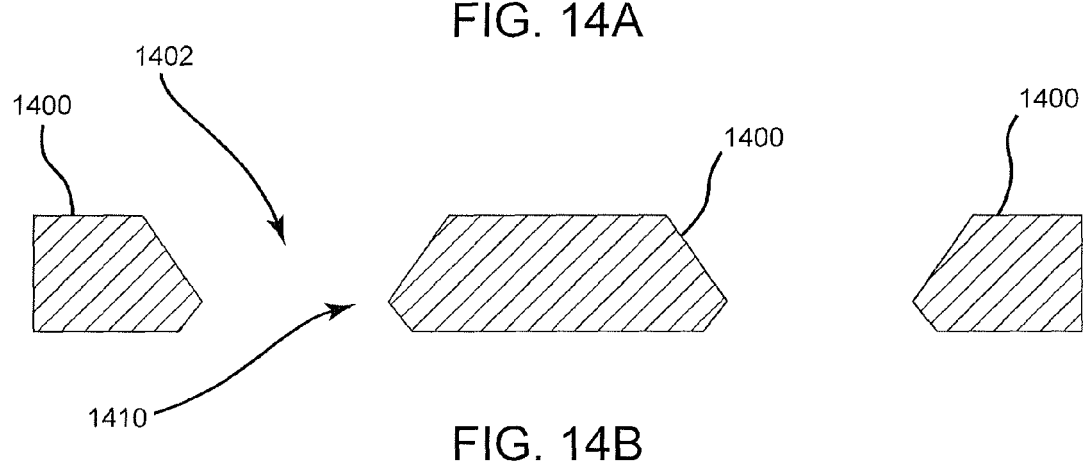
FIGS. 14B-14E are cross-sectional side views of stages in a method of forming replicated lenses in through-hole wells according to an embodiment.
Figure 14C:
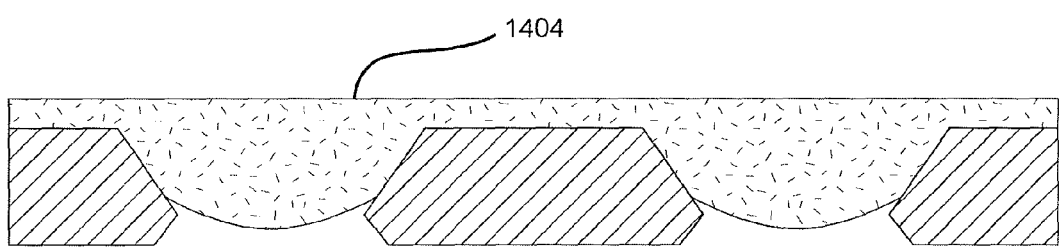

In contrast with previous embodiments where wells had a depth that was less than the thickness of the substrate, other embodiments may include wells that extend through the thickness of the substrate. FIG. 14A shows a perspective view of substrate 1400 which is similar to that of the one shown in FIG. 2. Unlike substrate 200 of FIG. 2, wells 1402 are formed entirely through the substrate. This can be seen more clearly in FIG. 14B, which is a cross-sectional view of a portion of the substrate of FIG. 14A. Wells 1402 are essentially through-holes that are created through etching, drilling, blasting, or other methods. The wells may be created by one or more steps to achieve the shape desired. The wells 1402 shown in FIG. 14B are tapered side walls 1410, which may be representative of an etch process. In other embodiments, the wells 1402 may have substantially straight side walls. FIG. 14C shows the substrate with a layer of replication material 1404 placed on one side. Based on properties of the replication material 1404 and the substrate 1400 as well as the method used to apply the replication material 1404, the replication material 1404 may be partially or fully drawn into the wells 1402. In some cases, the replication material 1404 might be deposited on both sides of the substrate 1400 to ensure a more even filling of the wells 1402, but this should not affect the nature of the final lens structure.

Figure 14D:
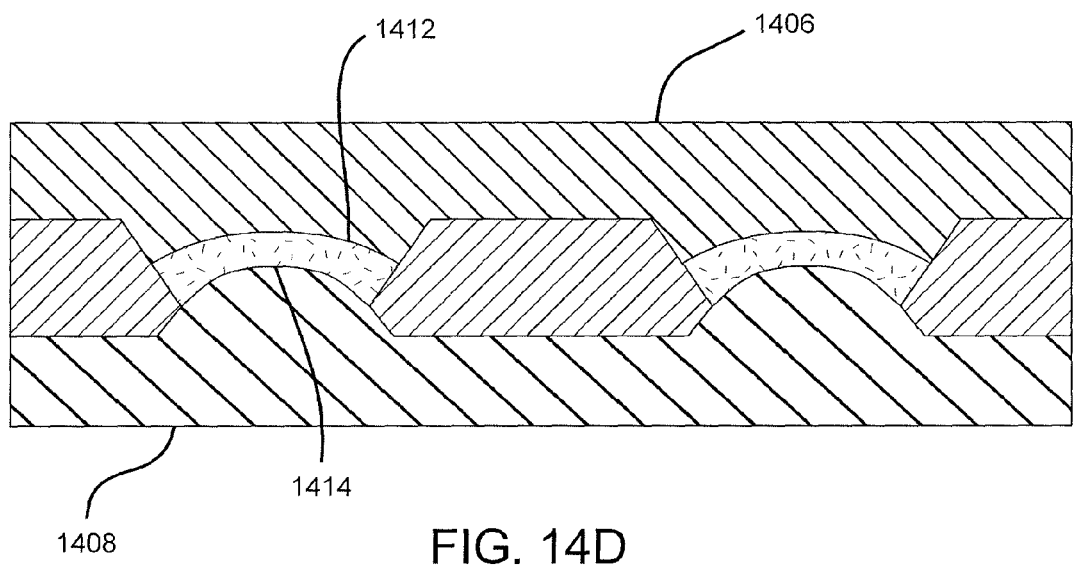
Figure 14E:
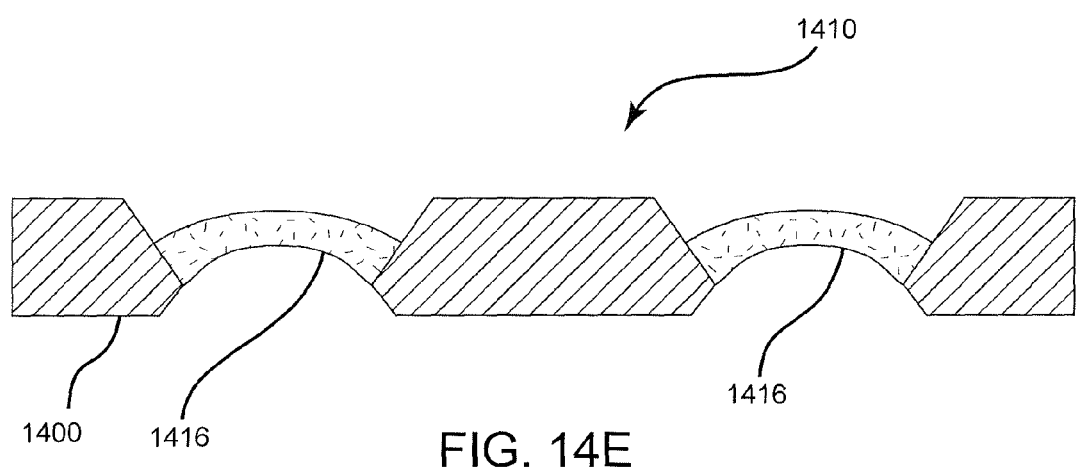

In the next step, FIG. 14D shows an upper replication master 1406 and a lower replication master 1408 placed against the substrate 1400 disposed to shape the replication material 1404 within the well 1402 from both sides of the substrate 1400. In the current embodiment, this operation is done simultaneously since the replication material 1404 can only be cured, even partially, once in this configuration. The lens-forming portions 1412, 1414 of both replication masters 1406, 1408 are aligned into the wells 1402. FIG. 14E shows the final lens structure 1410 wherein lens elements 1416 have been created. Note that each side of the lens element may have its own independent shape. Pictured here is a shape near to that of a meniscus lens, but other shapes such as biconvex or biconcave are achievable.

Figure 15A:
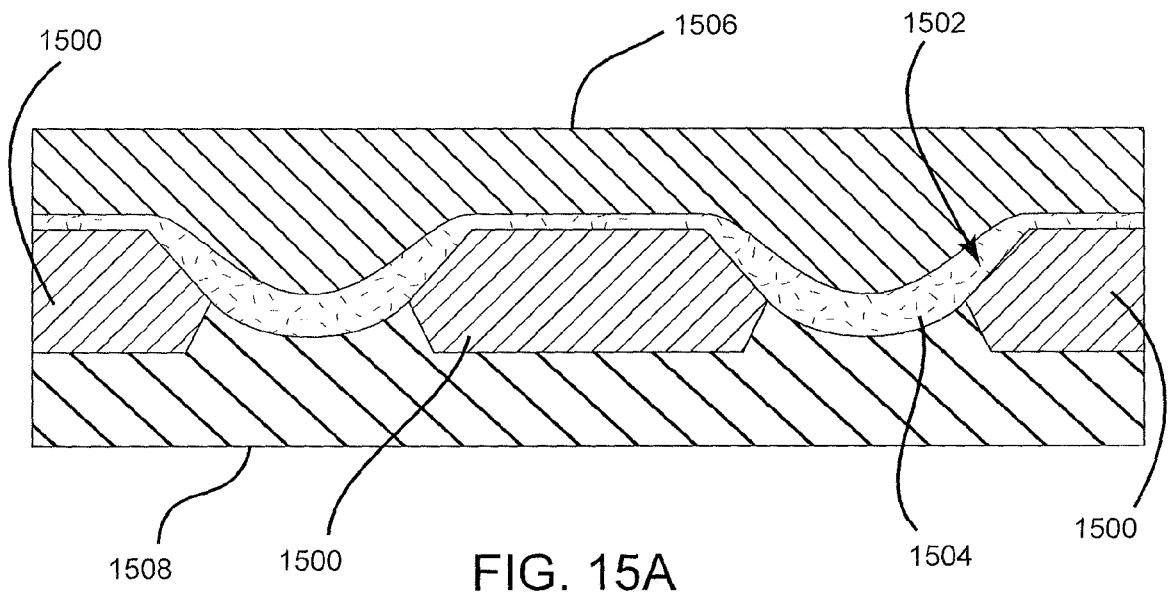
Figure 15B:
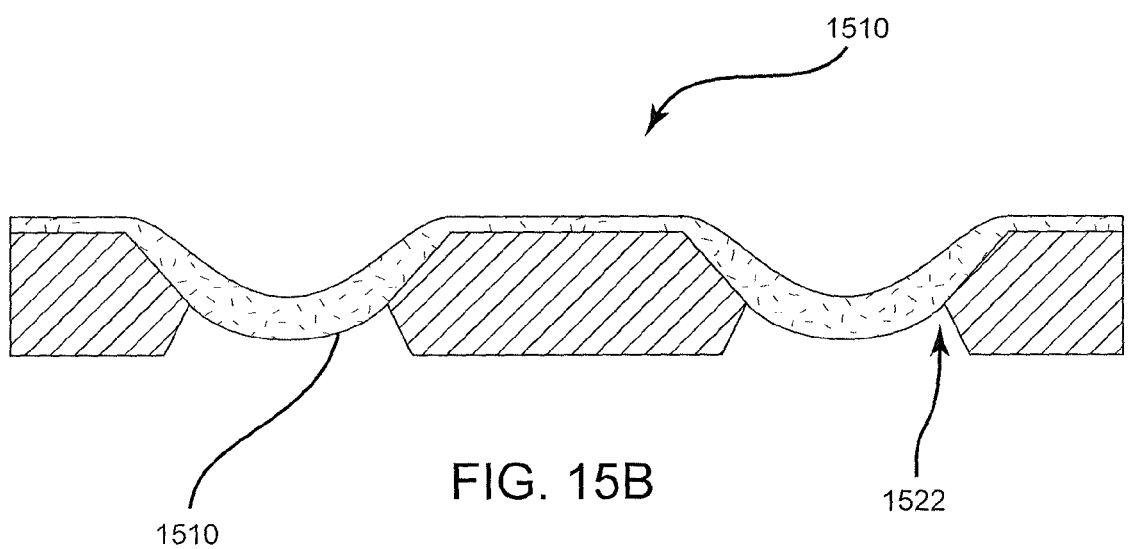
Figure 15C:
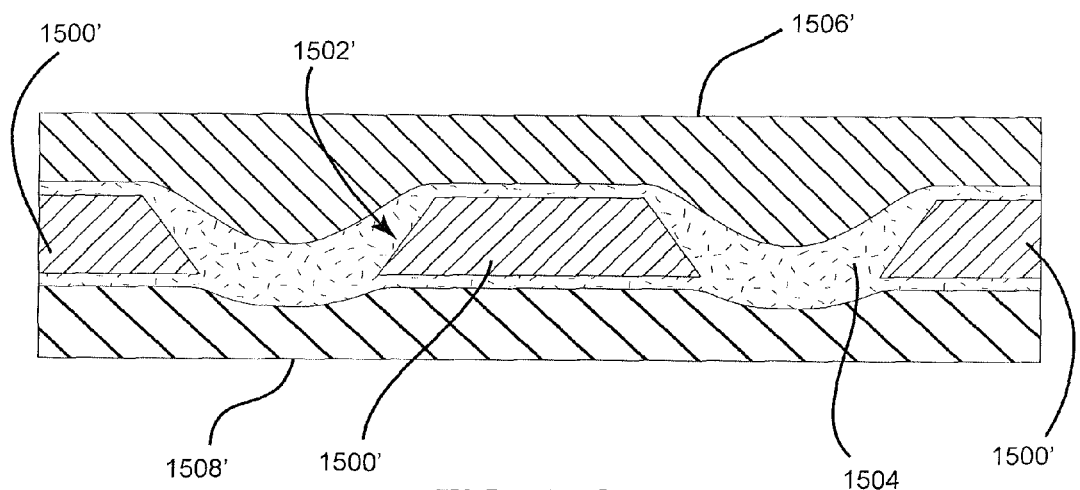

In another embodiment, one or two replication masters may be brought close to a substrate with through-hole wells but not actually touching it. FIG. 15A shows a substrate 1500 with such through-hole wells 1502. A replication material 1504 was deposited on the substrate 1500 and two replication masters 1506 and 1508 are brought near to the simultaneously shape the replication material 1504. In this example master 1508 is brought into contact with the substrate 1500 while master 1506 is held at a precise distance away from the substrate 1500 surface leaving room for excess replication material 1504 to be pressed out. Once the replication material 1504 is cured, the replication masters 1506, 1508 are removed to leave behind lens structure 1510 with lens elements 1516 which can be seen in FIG. 15B. FIG. 15C shows a variant of this embodiment, wherein replication material 1504 is deposited on the substrate 1500' and an upper replication master 1506' and a lower replication master 1508' are brought near to the substrate 1500' but leaving sufficient room for replication material 1504 to flow on both sides of the substrate 1500'. In the embodiment shown, the substrate 1500' includes wells 1502' that are tapered or conic in shape, with the taper extending inward from one side of the substrate 1500' to the other. The final result after curing is lens structure 1520, depicted in FIG. 15D that includes lens elements 1522. The resultant lens 1522 includes a generally meniscus shape with a thickness on the order of the substrate 1500' thickness. The curvature of the meniscus lens 1522 extends generally towards the same direction as the inward taper of the wells 1502' in which the lenses 1522 are formed.

Figure 15D:
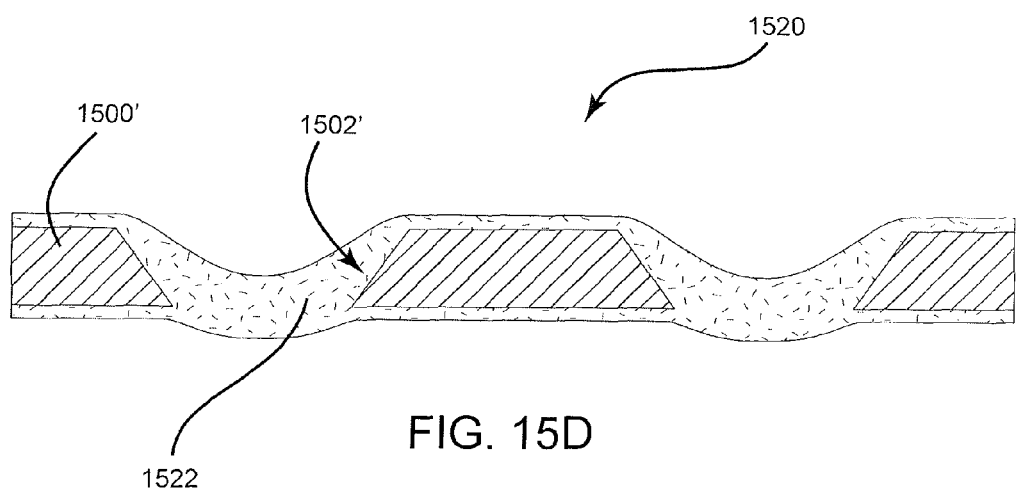

When the wells are through holes, as illustrated in FIGS. 14A to 15D, such that the substrate material is no longer in the optical path, constraints on the substrate used to provide these through holes are reduced. In other words, the substrate may be chosen for mechanical characteristics, e.g., rigidity and strength, without considering its optical characteristics. Conventional substrates with good optical characteristic may be expensive, subject to bowing, and/or may be brittle. For example, conventional substrates, e.g., silica and glass, have a Young's modulus $E \geq 35$ GPa, while other materials that may be used for the substrate having through holes, e.g., polymers, liquid crystal polymers, may have a much lower Young's modulus of $E \leq 20$ GPa, e.g., between about 1-15 GPa. Thus, additional replication materials, that may introduce too much stress on conventional substrates used for formation of optical elements, may be employed. For example, such a substrate may be a mesh structure in which through holes are defined by intersecting threads of material. These through holes may have any desired form, including arbitrary shapes. Further, use of the through holes allows an optical element having a distance between opposite sides of the replication material within the clear aperture to be less than a thickness of the substrate. Additionally, the substrate not subject to optical constraints may be used to reduce stray light in the system, e.g., may be opaque and/or dispersive. Further, the substrate may serve as an optical aperture. Finally, when the replication material is provided on both sides of the substrate, such that the substrate is embedded therein, as illustrated in FIGS. 15C and 15D, the thickness of the replication material in the clear aperture may be better controlled.

Figure 15G:
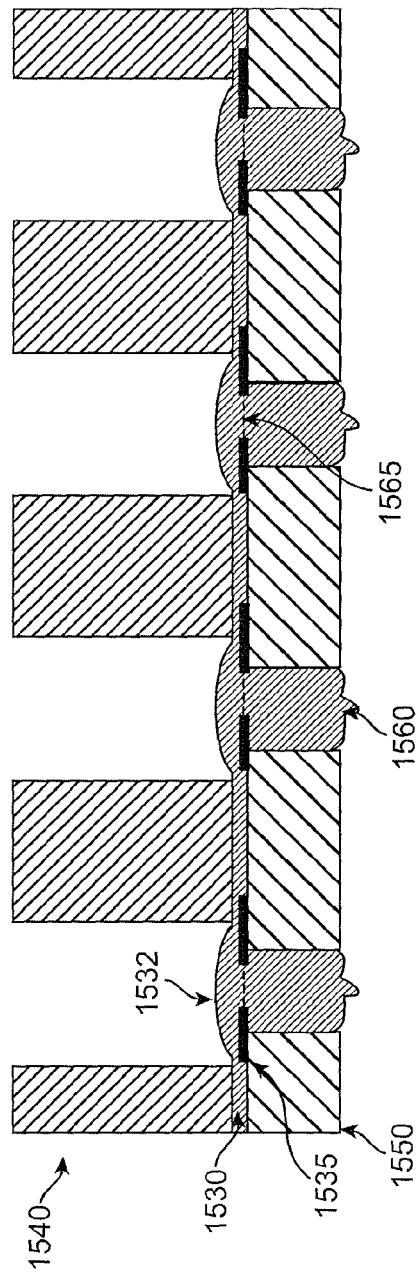
Figure 15H:
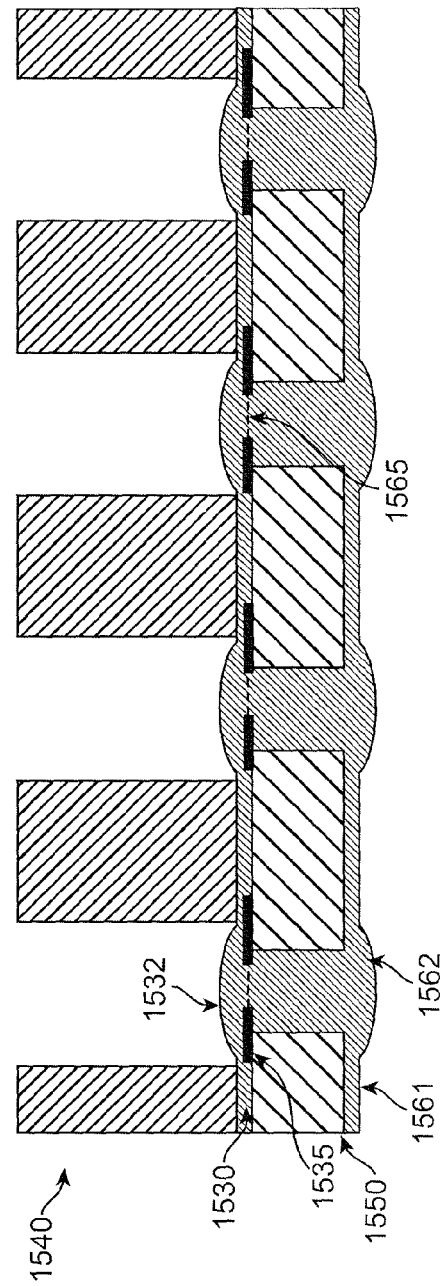

In other embodiments, the through holes are provided after one of the lens surfaces has been formed, as illustrated in FIGS. 15E to 15H. As illustrated in FIG. 15E, a first lens structure 1530 may include lens elements 1532 on a first surface thereof. A rigid structure 1540 is provided on the first surface of the first lens structure 1530 outside the clear apertures of the lens elements 1532. The rigid structure 1540 provides mechanical strength to the first lens structure 1530 and may be selected just for these mechanical properties, e.g., may be opaque. Details of formation of the structure illustrated in FIG. 15E may be found in commonly assigned U.S. application Ser. No. 12/497,441, filed Jul. 2, 2009, entitled "Wafer level Optical Elements and application thereof," which is hereby incorporated by reference. Generally, lens elements 1532 may be formed on one side of the first lens structure 1530 by a replication process as described herein. An opposite, generally flat side of the first lens structure 1530 is formed using a temporary molding surface (not shown) that is removed after the replication material is cured. Then, as illustrated in FIG. 15F, an additional substrate 1550 having through holes 1552 therein may be attached to the generally flat surface of the first lens structure 1530. These through holes 1552 may be narrower than the clear aperture of the lens elements 1532 and may serve as aperture stops if opaque. Further, apertures 1535 that extend into the through holes 1552 may be provided on a bottom surface of the first lens structure 1532. As illustrated in FIG. 15G, these through holes 1552 may then be filled with a replication material 1560, which may be the same as or different from the replication material used for the first lens structure 1530. A replication master (not shown) may then be brought into contact with the replication material 1560 to form a second lens structure 1561 that includes plurality of lens elements 1562. As these lens structures are formed at different times, an interface 1565 between the first and second lens structures will be apparent, even if they are made of the same material. This is in contrast to the lens structure formed simultaneously in the same material in FIGS. 15A to 15D, in which no interface may be apparent.

Figure 16A:
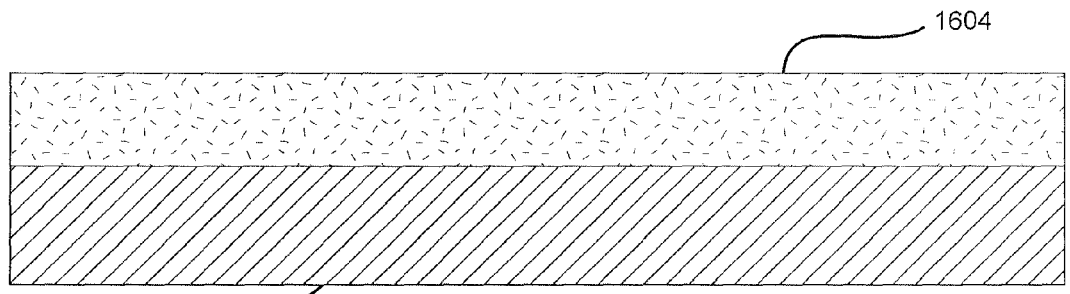
FIGS. 16A-16C are cross-sectional side views of stages in a method of forming replicated lenses and wells according to an embodiment.
Figure 16B:
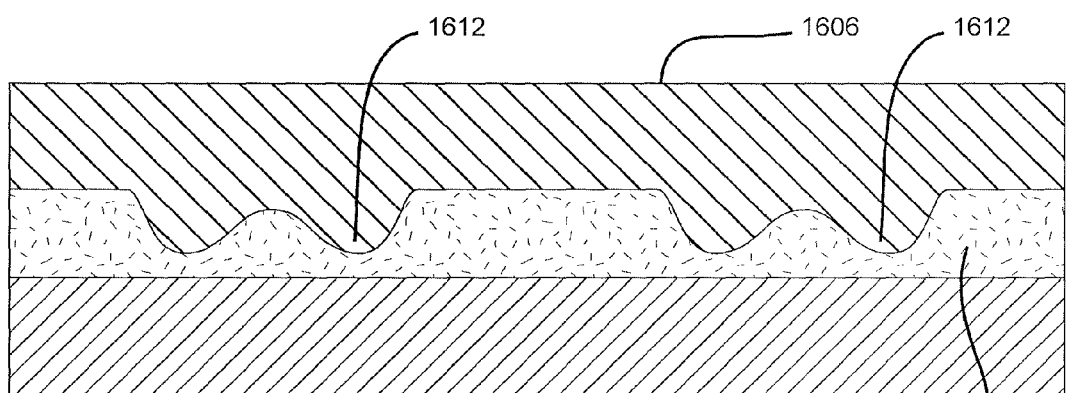
Figure 16C:
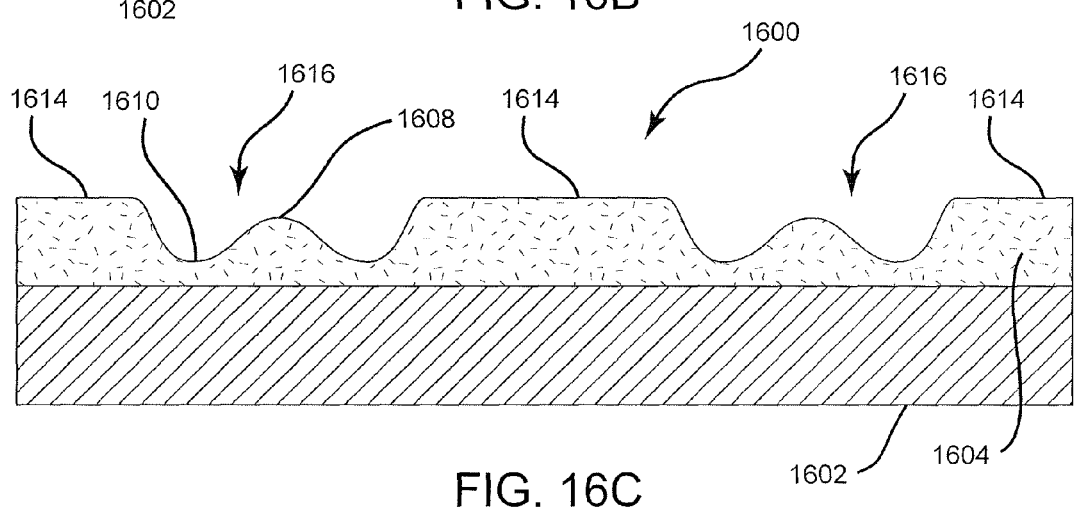

In other embodiments, the well is not formed in the substrate but simultaneously along with the lens elements in the replication material. FIG. 16A shows a substantially flat substrate 1602 with a layer of replication material 1604 placed on it. In FIG. 16B, a replication master 1606 is pressed onto the replication material 1604 and the replication material 1604 is cured. The replication master 1606 has lens-forming portions 1612 with both convex and concave shape. FIG. 16C shows lens structure 1600 wherein the master 1606 has been removed. Around the central convex lens 1608 is a concave portion 1610 that allows the full optical aperture of the convex lens 1608 to be formed. The upper surface 1614 of the replication material 1604 is substantially flat and is higher than the top of the lens 1608, thus leaving the convex portion protected inside a well-shaped structure 1616. As with previous embodiments, replication material could be patterned in this manner on both sides of the substrate 1602 either consecutively or simultaneously. Although this process could conceivably be used to form concave lens elements, they are already more protected than convex shapes since the optically active portion therein is below the upper surface of the replication material.

Figure 16D:
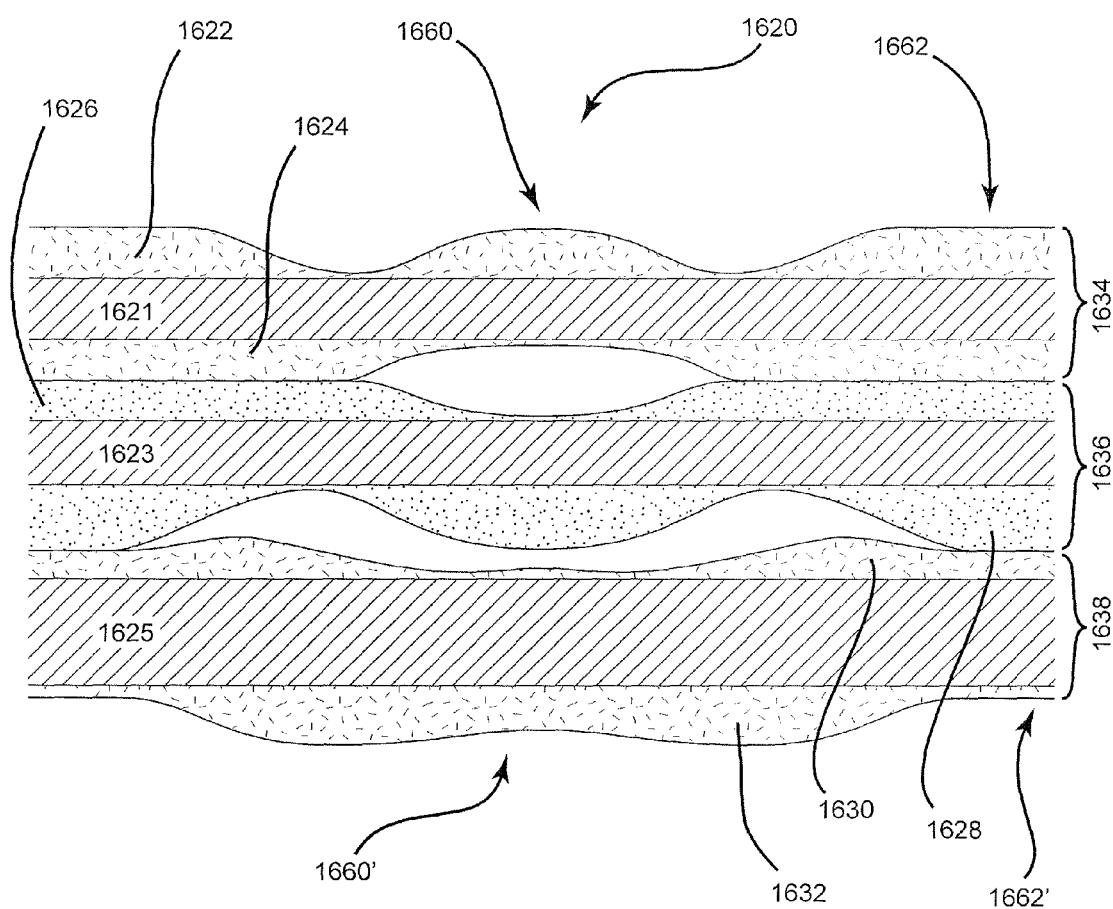
FIGS. 16D and 16E are cross-sectional side views of a lens stack of replicated lenses and wells according to an embodiment.

Similar to other embodiments, the previous embodiment may also be stacked to create complex lens stacks. FIG. 16D displays an exemplary embodiment of a lens stack 1620. The lens stack 1620 shows three lens structures 1634, 1636, 1638 stacked on top of each other to create the stack 1620. The first lens structure 1634 is composed of replication layers 1622 and 1624 formed from replication material on a substrate 1621. The second lens structure 1636 is composed of replication layers 1626 and 1628 formed from replication material on a substrate 1623. The third lens structure 1638 is composed of replication layers 1630 and 1632 formed from replication material on a substrate 1625. In general, each replication layer 1622, 1624, 1626, 1628, 1630, 1632 includes an optical region 1660 and a field region 1662 surrounding the optical region 1660. The field regions 1662 may be higher than the optical region 1660. For example, in replication layer 1622, the optical region 1660 is recessed below the field region 1662. In other cases, the field region 1662 may be below the optical region 1660. For example, the optical region 1660' of replication layer 1632 extends above the corresponding field region 1662'.

In embodiment shown in FIG. 16D, the lens structures 1634, 1636, 1638 are directly in contact with one another. For example, the field regions 1662 of replication layer 1624 are placed on the field regions 1662 of replication layer 1626. Here, they are shown in direct contact with each other, yet there may still be an adhesive layer between the two replication layers 1624, 1626. For purposes of optical design, spacer elements (not shown) may be included between the lens structures as well. Even where optical regions 1660 extend above field regions 1662, direct contact with replication layers is possible. The interface between the second and third lens structures (1636, 1638) is exemplary. Here the optical regions 1660 of replication layer 1630 extend through the plane of the interface between the corresponding field regions of replication layers 1630 and 1628. Nevertheless, due to the shape of replication layer 1628, the lens structures 1636, 1638 may still be placed in contact with each other at their respective field regions 1662. Subject to constraints of the particular optical design, these factors may allow for a lens stack with desirable optical properties but also low height.

Figure 16E:
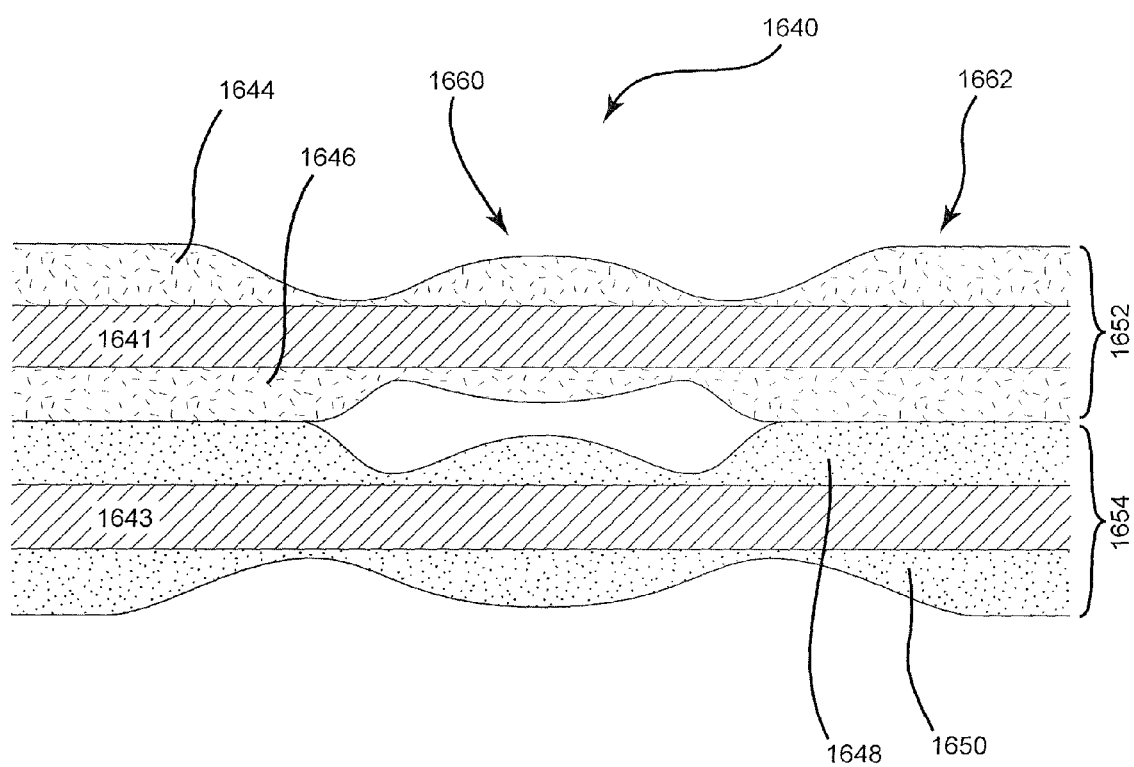

FIG. 16E shows a similar variant to that of FIG. 16D. In this variant, the lens stack 1640 is composed of two lens structures 1652, 1654. In this example, all four of the replication layers depicted herein (1644, 1646, 1648, 1650) have lenses in the optical regions 1660 that are substantially convex in shape. The convex portions of outer replication layers 1644 and 1650 are still below the plane of the corresponding field regions 1662 and so maintain some protection for the lens surfaces. Although the lenses in the optical regions 1660 of replication layers 1646 and 1648 are convex, nevertheless they may be placed in contact with each other at their field regions 1662 without the need for additional spacers between them.

In most of the previous embodiments, lens surfaces have been disposed so that their surfaces remain below an upper flat surface. This can simplify later processing steps. One example is that of correcting wafer bow. In many cases, a wafer or other substrate can become warped by many factors that cause residual stress in the wafer, including but not limited to improper balancing of replication layer forces, antireflection or IR coatings, or strain during other manufacturing steps. If this is not corrected in a lens wafer, it can lead to distortion of optical elements, improper focusing, or lateral displacement of the lens elements across the wafer.

Figure 17A:
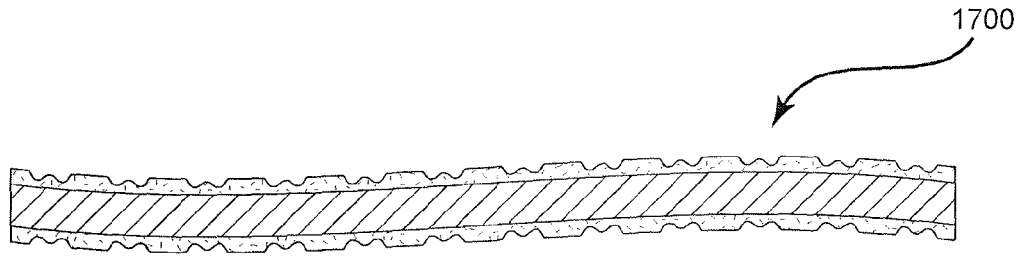
FIGS. 17A-17C are cross-sectional side views of stages in a method of correcting lens structure defects.
Figure 17B:
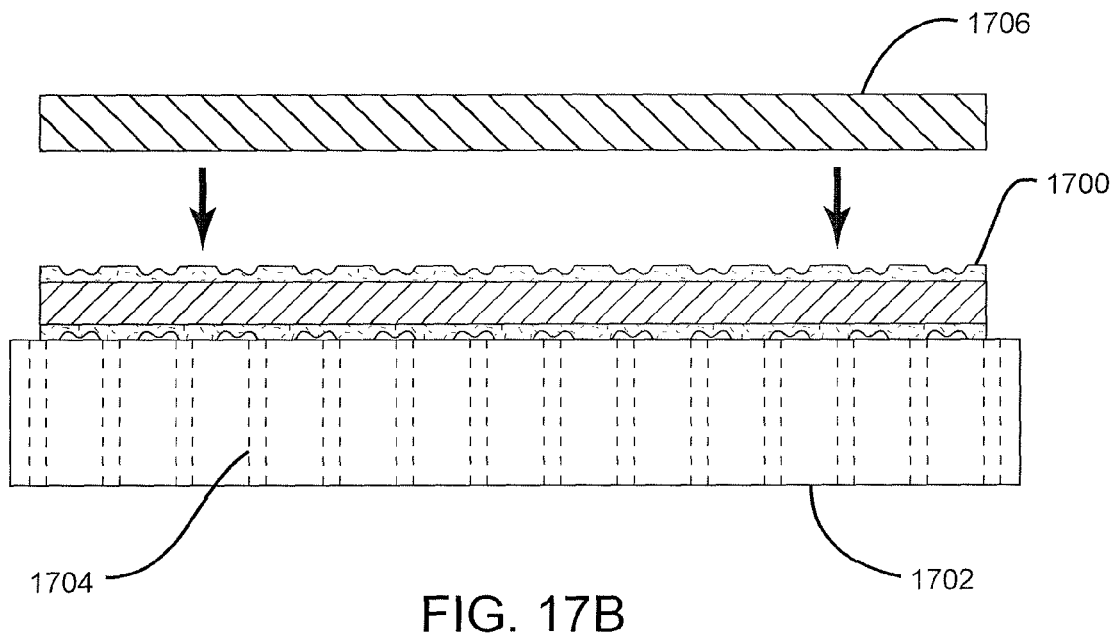
Figure 17C:
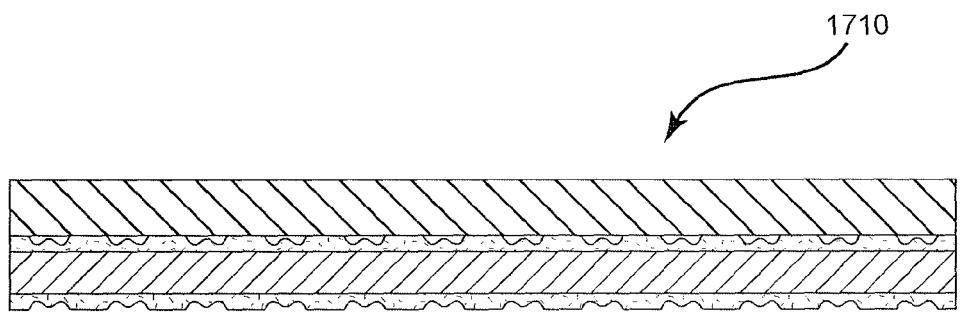

One example of this problem can be seen in FIG. 17A, which shows a cross-sectional view of lens structure wafer 1700. The wafer 1700 has a shape distorted from the desired flat shape. In this case, the distortion is represented with a shape having both concave and convex nature; the exact shape is not important, but a variety of curving defects might be present. Lenses on the surface correspond to those of replication layer 1600 in FIG. 16C, but other lens structures formed according to other various embodiments might be used here instead. FIG. 17B shows the lens wafer 1700 placed on the surface of a vacuum chuck 1702; dotted lines 1704 schematically represent a distributed set of vacuum lines going through the vacuum chuck that serve to pull the wafer 1700 onto its surface tightly, at least temporarily flattening out the wafer 1700. The wafer can be pulled down with enough force to flatten it because the lens elements that might have otherwise been protruding past the field regions 1662 of the replication layer are now placed in a protected position. Another substrate 1706 is coated with an adhesive and pressed onto the top surface of the lens wafer 1700. Substrate 1706 could represent a variety of other functions. It may be another lens structure wafer, an image sensor wafer, or even just a spacer wafer that would be later bonded to other structures. In some cases, substrate 1706 may even represent several other wafers already bonded such as other pieces of a lens stack. Stack 1710 is the result after bonding and removal from the vacuum chuck. Although some residual stresses may remain, they will now be shared by the entire stack and can be less problematic.

Figure 18A:
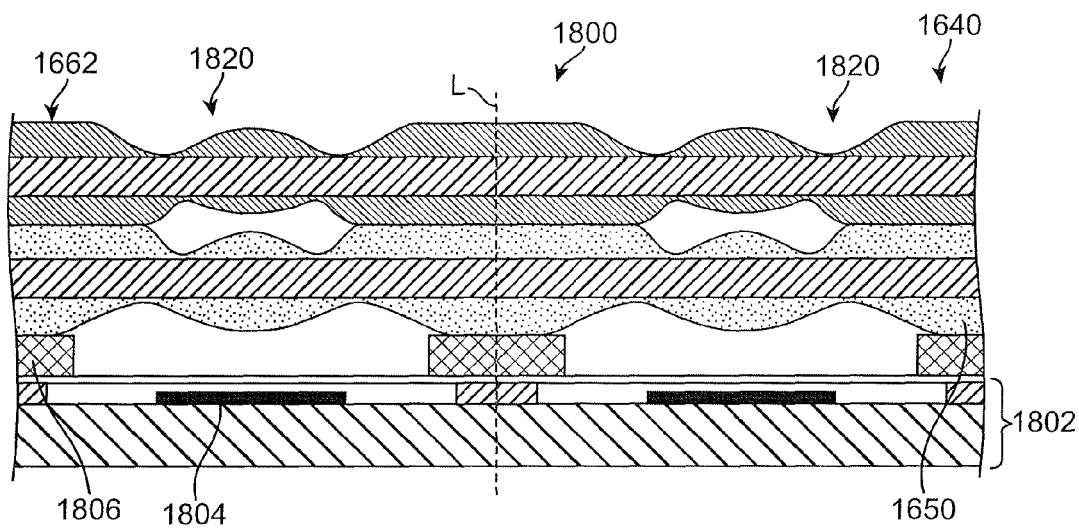
FIGS. 18A and 18B are cross-sectional side view of stages in a method of forming electro-optic modules.
Figure 18B:
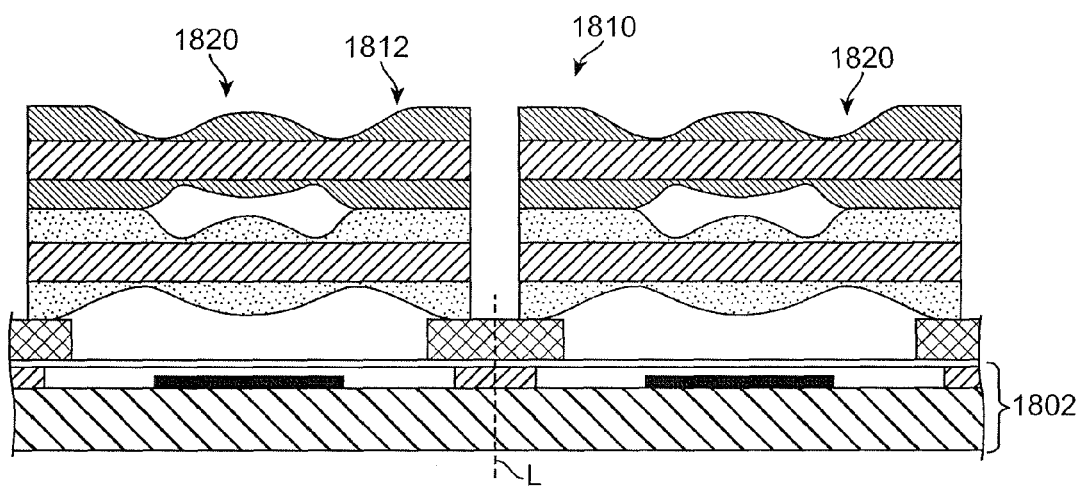

Optical structures described herein may be used in conjunction with other electrical components to create complete electro-optical modules. Examples may include light collecting modules such as cameras or data readers and light emitting modules such as LED arrays or video projection modules. FIGS. 18A and 18B illustrate these embodiments schematically.

In FIG. 18A, the wafer level lens stack 1640 of FIG. 16E is aligned and bonded to an electronics wafer 1802. In the embodiment shown, the lens stack 1640 is secured to the electronics wafer 1802 with a spacer wafer 1806. In other embodiments, as described above, spacing may be provided by the field regions 1662 of the bottom replication layer 1650 in the lens stack 1640. The electronics wafer 1802 may be, for example, an array of image sensors, laser or LED emitters, MEMS devices, and such. In the particular embodiment shown, the electronics wafer 1802 is an array of wafer packaged image sensors 1804 such as the Shellcase® line of packaged image sensors available from Tessera Inc., San Jose, Calif. The resultant structure 1800 is an array of electro-optical modules that can be singulated along dicing lanes L to create individual electro optical modules 1820. In one embodiment, the electro-optical module 1820 is a wafer level camera.

In FIG. 18A, the lens stack 1640 and the electronics wafer 1802 are aligned and bonded with each as stacked wafer packages. In other embodiments, such as the embodiment depicted in FIG. 16B, one or both of the lens stacks 1640 and electronics wafer 1802 may be diced and singulated prior to aligning and bonding to the other. Specifically, FIG. 16B shows diced lens modules 1812 formed by prior dicing of the lens stack 1640 that are secured to electronics wafer 1802 to form electro-optical modules 1820 that are ultimately singulated along dicing lanes L.

While the above description makes reference to illustrative embodiments for particular applications, it should be understood that the claimed invention is not limited thereto. For example, sidewalls of the wells in any of the above embodiments may be treated to reduce stray light or suppress reflection, e.g., may be roughened to reduce specular reflection, may include an anti-reflective coating, or may include a dispersive or opaque coating. Those having ordinary skill in the art and access to the teachings provided herein will recognize additional modifications, applications, and embodiments within the scope thereof and additional fields in which the invention would be of significant utility without undue experimentation.

What is claimed is:

1. An optics block, comprising:
a substrate with a plurality of wells, the substrate being a first material, each well having a bottom surface and sidewalls; and
a convex lens surface in each of the plurality of wells, the convex lens surface being in a second material different than the first material and opposite the bottom surface, the convex lens surface being an uppermost lens surface in each well, the convex lens surface being below an upper opening of each well.

2. The optics block of claim 1, wherein the bottom surface is closed such that the upper opening overlaps the first material, the second material contacts the first material, and the convex lens surface overlaps the bottom surface.

3. The optics block of claim 1, wherein the bottom surface is a lower opening, the convex lens surface overlapping the lower and upper openings.

4. The optics block of claim 3, further comprising a second lens surface on a surface of the second material opposite that of the convex lens surface, the second lens surface overlapping the convex lens surface.

5. The optics block of claim 4, wherein the second lens surface is a concave lens surface, the second lens surface and the convex lens surface forming a meniscus lens.

6. The optics block of claim 1, wherein the convex lens surface is part of lens element.

7. The optical block of claim 6, wherein lens element is a biconvex lens.

8. The optical block of claim 6, further comprising a concave lens surface in a third material having a different optical property than the second material.

9. The optical block of claim 8, wherein the concave lens surface is in contact with a surface of the lens element.

10. The optical block of claim 9, wherein the surface of the lens element contacting the concave lens surface is conformal with the concave lens surface.

11. The optical block of claim 8, wherein the lens element and the concave lens surface form a doublet.

12. The optics block of claim 1, wherein the substrate includes an electronic element.

13. The optical block of claim 12, wherein the electronic element is an image sensor.

14. The optics block of claim 12, wherein the electronic element is a MEMS device.

* * * * *